United States Patent
Kim et al.

(10) Patent No.: US 10,353,490 B2
(45) Date of Patent: Jul. 16, 2019

(54) IMAGE DISPLAY APPARATUS, DRIVING METHOD OF IMAGE DISPLAY APPARATUS, AND COMPUTER READABLE RECORDING MEDIUM

(71) Applicant: SAMSUNG ELECTRONICS CO., LTD., Suwon-si, Gyeonggi-do (KR)

(72) Inventors: Do-sung Kim, Hwaseong-si (KR); Yong-deok Kim, Anyang-si (KR); Kyu-jung Jo, Suwon-si (KR); Kwan-young Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 264 days.

(21) Appl. No.: 15/366,411

(22) Filed: Dec. 1, 2016

(65) Prior Publication Data
US 2017/0160823 A1  Jun. 8, 2017

(30) Foreign Application Priority Data

Dec. 4, 2015  (KR) .................. 10-2015-0172515

(51) Int. Cl.
G09G 5/08 (2006.01)
G06F 3/0346 (2013.01)
G06F 3/038 (2013.01)
G08C 17/00 (2006.01)

(52) U.S. Cl.
CPC ............ *G06F 3/0346* (2013.01); *G06F 3/038* (2013.01); *G08C 17/00* (2013.01); *G09G 5/08* (2013.01)

(58) Field of Classification Search
CPC ...... G06F 3/0346; G06F 3/038; G06F 1/1694; G08C 17/00; G09G 5/08

USPC ........................................... 345/158
See application file for complete search history.

(56) References Cited

U.S. PATENT DOCUMENTS

| | | | |
|---|---|---|---|
| 2008/0134784 A1 | 6/2008 | Jeng et al. | |
| 2008/0278445 A1* | 11/2008 | Sweetser | G06F 3/0325 345/158 |
| 2011/0055865 A1 | 3/2011 | Jung | |
| 2013/0342455 A1* | 12/2013 | Choi | G06F 3/017 345/158 |
| 2015/0261409 A1* | 9/2015 | Tanaka | G06F 3/017 715/856 |

FOREIGN PATENT DOCUMENTS

| | | |
|---|---|---|
| EP | 3 051 827 | 8/2016 |
| JP | 2008-146619 | 6/2008 |
| JP | 2009-302690 | 12/2009 |
| JP | 2014-204240 | 10/2014 |
| JP | 2014204240 A * | 10/2014 |
| KR | 10-2011-0023406 | 3/2011 |
| KR | 10-2015-0081205 | 7/2015 |

* cited by examiner

*Primary Examiner* — Mark Edwards
(74) *Attorney, Agent, or Firm* — Nixon & Vanderhye P.C.

(57) ABSTRACT

An image display apparatus, a driving method of the image display apparatus, and a computer readable recording medium are provided. The image display apparatus may include: a display; and a processor configured to control the display to display a pointer at a preset area of a screen when a position to which a remote control apparatus directs is outside of the screen of the display, to move the pointer into the screen to correspond to a movement amount of the position and display the pointer, and to display the pointer at the position to which the remote control apparatus directs.

17 Claims, 20 Drawing Sheets

100

100a

IMAGE DISPLAY APPARATUS, DRIVING METHOD OF IMAGE DISPLAY APPARATUS, AND COMPUTER READABLE RECORDING MEDIUM

CROSS-REFERENCE TO RELATED APPLICATION

This application is based on and claims priority under 35 U.S.C. § 119 to Korean Patent Application No. 10-2015-0172515, filed on Dec. 4, 2015 in the Korean Intellectual Property Office, the disclosure of which is incorporated by reference herein in its entirety.

BACKGROUND

Field

The present disclosure relates generally to an image display apparatus, a driving method of the image display apparatus, and a computer readable recording medium, and for example, to an image display apparatus capable of more intuitively controlling a pointer for selecting items displayed on a screen of the image display apparatus, for example, when a user uses a remote control, a driving method of the image display apparatus, and a computer readable recording medium.

Description of Related Art

With the development of electronic technologies, various methods for controlling an electronic device have been developed. Conventionally, the electronic device is controlled using buttons installed in the electronic device or a remote control that is a separate device from the electronic device. When the electronic device is controlled using the remote control that is the separate device, there is a problem in that a user needs to check the buttons installed on the remote control one by one and perform a pressing manipulation to perform his/her desired manipulation.

For example, when the pointer displayed on a screen of the electronic device is used to select specific contents on the screen, the user alternately selects a four-way button of the remote control several times to move the point to the corresponding content area and presses a select button installed on the remote control in the corresponding content area to select the specific contents. That is, the user has trouble in selecting the corresponding content by performing an operation of confirming the buttons installed on the remote control several times and pressing the buttons several times.

To supplement the problem, conventionally, there is a method for sensing, by a sensor installed in a remote control, a motion of a user, that is, a motion of a remote control to move a pointer to a user desired item to thereby select the desired item.

By the way, the method has a problem in that the pointer is always displayed at a center of a screen such as DTV based on a relative coordinate pointing scheme and therefore is not intuitive by a user. Therefore, there is a need for a method for allowing a user to more conveniently search for information displayed on a screen of an electronic device even at a long distance.

SUMMARY

Example embodiments of the present disclosure address the above disadvantages and other disadvantages not described above.

The present disclosure provides an image display apparatus capable of more intuitively controlling a pointer for selecting items displayed on a screen of the image display apparatus, for example, when a user uses a remote control, a driving method of the image display apparatus, and a computer readable recording medium.

According to an example aspect of the present disclosure, an image display apparatus includes: a display; and a processor configured to control the display to display a pointer at a preset area of a screen when a position to which a remote control apparatus directs is outside of the screen of the display, to move the pointer into the screen to correspond to a movement amount of the position and display the pointer, and to display the pointer at the position to which the remote control apparatus directs.

The display may display the pointer at an edge of the screen in a direction in which the position is out of the screen or a center of the screen.

The image display apparatus may further include: a communication interface comprising communication circuitry configured to receive position information associated with the movement amount from the remote control apparatus, wherein the processor may be configured to control the display to move the pointer based on the received position information and display the pointer on the screen.

The processor may control the display to determine a difference between the position to which the remote control apparatus directs and the position of the pointer moved and displayed and display the pointer at the position when the determined difference is equal to or more than a first threshold value.

The processor may control the display to determine whether a motion variation of the remote control apparatus is equal to or more than a second threshold value when the determined difference is equal to or more than the first threshold value and display the pointer at the position when the motion variation is equal to or more than the second threshold value.

The processor may differently perform a correction by making a degree of correction different depending on a direction of the motion.

The processor may add a weight to a motion variation of the pointer to perform the correction when the remote control apparatus moves in an opposite direction of the pointer.

The processor may add different sizes of weights depending on the size of the variation to perform the correction.

The processor may subtract a weight from a motion variation of the pointer to perform the correction when the remote control apparatus moves in the direction of the pointer.

According to another example aspect of the present disclosure, a method of driving an image display apparatus includes: displaying a pointer at a preset area of the screen when a position to which a remote control apparatus directs is outside of a screen of the image display apparatus; moving the pointer into the screen to correspond to a movement amount of the position and displaying the pointer; and displaying the pointer at the position to which the remote control apparatus directs.

In the displaying of the pointer at the preset area, the pointer may be displayed at an edge of the screen in a direction in which the position is out of the screen or a center of the screen.

The driving method may further include: receiving position information associated with the movement amount from the remote control apparatus, in which in the moving and displaying of the displayed pointer, the pointer may move based on the received position information.

The displaying of the pointer at the position to which the remote control apparatus directs may include: determining a difference between the position to which the remote control apparatus directs and the position of the pointer moved and displayed, and displaying the pointer at the position when the determined difference is equal to or more than a first threshold value.

The displaying of the pointer at the position to which the remote control apparatus directs may further include: determining whether a motion variation of the remote control apparatus is equal to or more than a second threshold value when the determined difference is equal to or more than the first threshold value, and the pointer may be displayed at the position when the determined difference is equal to or more than the second threshold value.

The displaying of the pointer at the position to which the remote control apparatus directs may further include: differently performing a correction by making a degree of correction different depending on a direction of the motion.

In the differently performing the correction by making the degree of correction different, a weight may be added to a motion variation of the pointer to perform the correction when the remote control apparatus moves in an opposite direction of the pointer.

In the differently performing the correction by making the degree of correction different, different sizes of weights may be added depending on the size of the variation to perform the correction.

In the differently performing the correction by making the degree of correction different, a weight may be subtracted from a motion variation of the pointer to perform the correction when the remote control apparatus moves in a direction of the pointer.

According to another example aspect of the present disclosure, a computer readable recording medium includes a program for executing a driving method of an image display apparatus, in which the driving method of the image display apparatus includes: performing a control to display a pointer at a preset area of the screen when a position to which a remote control apparatus directs is outside of a screen of the image display apparatus; performing a control to move the pointer into the screen to correspond to a movement amount of the position and display the pointer; and performing a control to display the pointer at the position to which the remote control apparatus directs.

BRIEF DESCRIPTION OF THE DRAWINGS

The above and/or other aspects of the present disclosure will be more apparent from the following detailed description, taken in conjunction with the the accompanying drawings, in which like reference numerals refer to like elements, and wherein.

DETAILED DESCRIPTION

Figure 1:
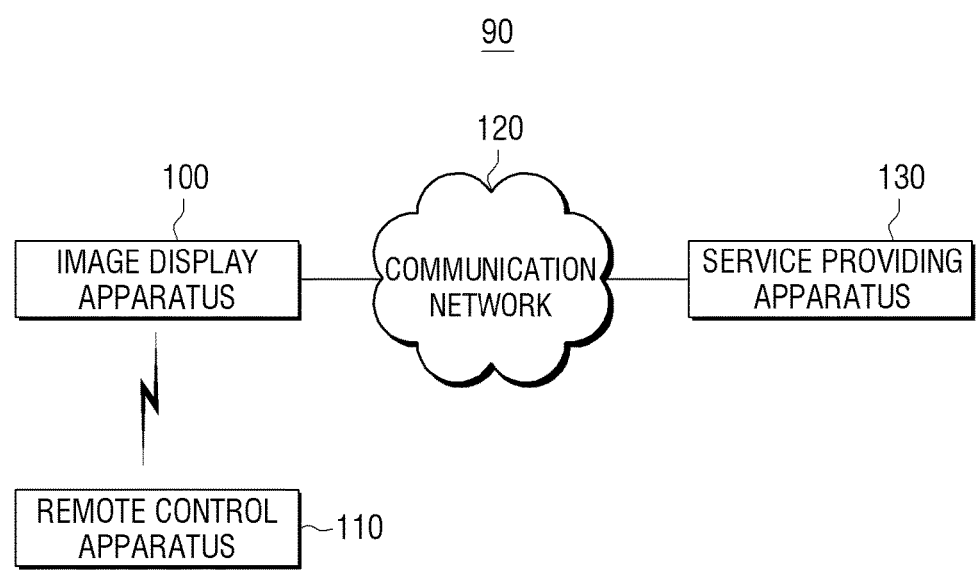
FIG. 1 is a diagram illustrating an example image processing system according to the present disclosure.

The example embodiments of the present disclosure may be diversely modified. Accordingly, various example embodiments are illustrated in the drawings and are described in detail in the detailed description. However, it is to be understood that the present disclosure is not limited to a specific example embodiment, but includes all modifications, equivalents, and substitutions without departing from the scope and spirit of the present disclosure. Also, well-known functions or constructions are not described in detail since they would obscure the disclosure with unnecessary detail.

The terms "first", "second", etc. may be used to describe diverse components, but the components are not limited by the terms. The terms are only used to distinguish one component from the others.

The terms used in the present disclosure are only used to describe the example embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the example embodiment of the present disclosure, a "module" or a "unit" performs at least one function or operation, and may be implemented with hardware (e.g., circuitry), software, or a combination of hardware and software. In addition, a plurality of "modules" or a plurality of "units" may be integrated into at least one module except for a "module" or a "unit" which has to be implemented with specific hardware, and may be implemented with at least one processor (not shown).

Hereinafter, the present disclosure will be described in greater detail with reference to the accompanying drawings.

Figure 2:
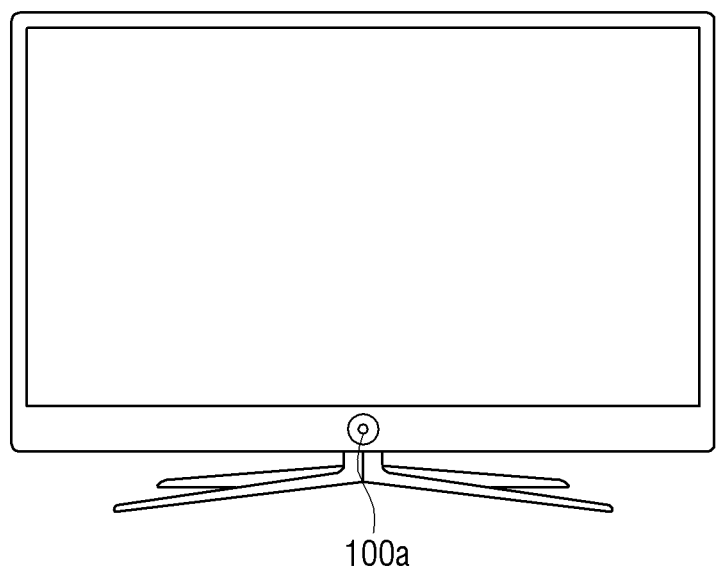
FIG. 2 is a diagram illustrating an example appearance of TV as one example of an image display apparatus illustrated in FIG. 1.

FIG. 1 is a diagram illustrating an example image processing system according to the present disclosure and FIG. 2 is a diagram illustrating an example appearance of TV as one example of an image display apparatus illustrated in FIG. 1.

As illustrated in FIG. 1, an image processing system 90 according to the present disclosure includes a part or the whole of an image display apparatus 100, a remote control apparatus 110, a communication network 120, and a service providing apparatus 130.

Herein, the "including a part or the whole" may refer, for example, to a situation in which the communication network 120 is omitted in the image processing system 90 and thus the service providing apparatus 130 (ex. BD player, etc.) may perform direct communication (ex. P2P, HDMI cable) with the image display apparatus 100, and the case in which all of the components described above are included will be described to help sufficient understanding of the present disclosure.

As the image display apparatus 100, an electronic device interworking with the remote control apparatus 110 is preferable. For example, the image display apparatus 100 may include DTV, a desk top computer, a laptop computer, a tablet PC, audio equipment, etc. The image display apparatus 100 displays a pointer on a screen only when a user holds a remote control, that is, the remote control apparatus 110 not to disturb image viewing of a viewer, and therefore is compared with a general computer that always displays a pointer of a mouse. Here, the pointer may, for example, refer to a mark (or sign) visually displaying a motion of the remote control apparatus 110 on the screen of the image display apparatus 100.

The image display apparatus 100 according to the present disclosure may receive a communication signal provided from the remote control apparatus 110 when a user holds the remote control apparatus 110. In this case, the communication signal may have various forms. For example, the remote control apparatus 110 may provide the communication signal, including coordinate information and if there is no coordinate information, may provide the communication signal, including information notifying that there is no coordinate information.

The image display apparatus 100 may determine an output scheme of a pointer output on a screen based on an information analysis of the received signal. The image display apparatus 100 according to the present disclosure may not determine the output scheme. In other words, only when the coordinate information is received from the remote control apparatus 110, the pointer may be output to a position designated by a user according to an absolute coordinate scheme based on the information. Therefore, the present disclosure is not particularly limited to determining the output scheme.

When a user directs (or indicates screen direction) the remote control apparatus 110 to the screen of the image display apparatus 100 while holding the remote control apparatus 110, the image display apparatus 100 according to the present disclosure may display a pointer at an indicated position in the directed direction and when the remote control apparatus 110 does not direct to the screen, may display the pointer at the center of the screen. According to the present disclosure, the former may be called the output of the pointer based on the absolute coordinate scheme and the latter may be called the pointer output based on the relative coordinate scheme. That is, the image display apparatus 100 outputs the pointer to the screen by other schemes depending on whether a user directs the remote control apparatus 110 to the screen of the image display apparatus 100.

For example, the image display apparatus 100 generates position information based on a sensing sensor 100a of FIG. 2 to output the pointer to the screen by the absolute coordinate scheme. In other words, if the position information, that is, the coordinate information is transmitted from the remote control apparatus 110, the image display apparatus displays the display position of the pointer based on a set value for a preset position of the sensing sensor 100a and the coordinate information received by the remote control apparatus 110 to display the pointer at the determined position. After the remote control apparatus 110 is held by a user, when there is no received signal, a signal of coordinate value (0, 0) is received as the position information, or notification that there is no coordinate information is received, the image display apparatus 100 outputs the pointer to the center of the screen depending on an initial setting of a system designer.

The image display apparatus 100 changes the position of the pointer based on the position information provided when the user manipulates the remote control apparatus 110. That is, the pointer displayed on the initial screen is determined by the absolute coordinate scheme and displayed, but the subsequent movement of the pointer is made by being calculated by the relative coordinate scheme.

Meanwhile, even though the remote control apparatus 110 does not include a camera (or motion tracking sensor), etc., the image display apparatus 100 determines whether the remote control apparatus 110 may direct to a screen area of the image display apparatus 100 and notify the remote control apparatus 110 of the determined results. For example, when the image display apparatus 100 includes a camera to operate the camera of the image display apparatus 100, it may be appreciated whether the user directs the remote control apparatus 110 to the screen while holding the remote control apparatus 110 and so on based on an analysis of the photographed image. In this case, the point to which the user directs the remote control apparatus 110 may be calculated to display the pointer on the screen by the absolute coordinate scheme. Next, it is enough to use sensing values provided from the remote control apparatus 110 as the coordinate values displayed by the relative coordinate scheme. Here, the "screen (region)" means a screen display area of the image display apparatus 100 on which the image is displayed but may further include a margin. In other words, if the pointer is in an error range even though it is slightly out of the screen display area, it is determined that the pointer is positioned at an edge of the screen display area to display the pointer.

Further, when the position to which the remote control apparatus 110 directs (or indicates) is out of the screen of the image display apparatus 100, the image display apparatus 100 displays the pointer at the edge area of the screen in the direction in which the position is out of the screen and the image display apparatus 100 may continuously display the pointer on the screen while changing the position of the pointer around the edge depending on the motion of the remote control apparatus 110 at the area out of the screen (ex. including the error range). In this state, the user may move the remote control apparatus 110 to direct the remote control apparatus 110 to the screen of the image display apparatus 100 again. At this point, since the pointer displayed on the screen of the image display apparatus 100 moves on the screen by the relative coordinate scheme, there may be a mismatch between the position to which the remote control apparatus 110 directs on the screen of the image display apparatus 100 and a position of a pointer displayed on a current screen. Here, the "relative coordinate scheme" may refer, for example, to a scheme of using sensing values sensed by a sensor of the remote control apparatus 110 to determine the position at which the pointer is displayed on the screen, that is, the coordinate values.

When the mismatch occurs, the image display apparatus 100 performs a correction between the two positions within the range which the user is not confused. In other words, the mismatch degree is slowly or gradually reduced every time the user moves the remote control apparatus 110 and thus the pointer is displayed at the position on the screen to which the user directs the remote control apparatus 110 at any moment. That is, the image display apparatus 100 allows the pointer displayed on the screen to rapidly follow up the position on the screen to which the remote control apparatus 110 directs. For this purpose, the image display apparatus 100 may execute a separate program, that is, algorithm that performs the correction operation, like a scheme of allocating a weight depending on a preset condition.

In more detail, first, the image display apparatus 100 determines whether the state in which the remote control apparatus 110 is out of the screen is changed to the state in which the remote control apparatus 110 directs to the screen. The determination may be made by sensing, by the remote control apparatus 110, a sensing signal output from a sensing signal generator 310 of FIG. 3 and then notifying the image display apparatus 100 of the sensing signal. Here, as the "sensing signal", an infrared signal is described as an example. In addition thereto, audio output from the image display apparatus 100 is sensed by the remote control apparatus 110 and then characteristics of the sensed audio signal are analyzed, thereby determining whether the state in which the remote control apparatus 110 re-directs to the screen. Alternatively, the position to which the remote control apparatus 110 directs is continuously sensed based on the absolute coordinate values and stored and then is referenced, thereby determining whether the state is changed. The determination on whether the directed position enters the screen may be made by various methods and therefore the present disclosure is not particularly limited thereto.

Further, if it is determined that the remote control apparatus 110 directs to the screen again, the image display apparatus 100 may determine how large the mismatch degree is. To this end, for example, a distance between the two positions may be calculated and thus it may be determined whether the calculated distance value is larger or smaller than a threshold value. Here, the "threshold value" may mean an error range. For example, absolute coordinate values of a leftmost pixel of an upper end of the screen, that is, a subpixel are set to be (1, 1). In the state in which the position to which the remote control apparatus 110 directs is out of the screen, the pointer may be displayed at position (2, 2) of the screen. In this state, if the user moves the remote control apparatus 110 to move a variation to x and y axes, respectively, by 5, the position on the screen to which the remote control apparatus 110 directs is determined based on, for example, a coordinate value (1, 1) and thus may be pixel positions of (6, 6) and the position of the pointer displayed on the current screen is changed based on (2, 2) and thus may be displayed at an absolute coordinate value (7, 7). As a result of trying to explain the present disclosure to help the understanding of the present disclosure, the mismatch degree between the two positions appear to be small, but actually (or in real environment), the mismatch may be very large. In this case, the image display apparatus 100 stores the absolute coordinate values calculated based on the position and uses the stored absolute coordinate values to know the coordinate values of the two positions, and therefore may obtain a distance d between the two points based on a formula obtaining the distance. When the distance is smaller than the threshold value, the image display apparatus 100 does not perform the correction operation, while when the distance is larger than the threshold value, the image display apparatus 100 may perform the correction operation. The threshold value associated with the distance may be named a first threshold value in the present disclosure. Even though the distance is not obtained, the mismatch degree may be determined even by the scheme of comparing variations for each variables x and y with the threshold value, and therefore the present disclosure is not particularly limited to any one scheme.

Further, if the image display apparatus 100 determines that the mismatch degree, that is, the distance between the two positions or the variation of the respective variables is larger than the first threshold value, when the user continuously moves the remote control apparatus 110, it may be further determined whether the variation associated with the motion is larger than the second threshold value. In other words, since the user may recognize that there is currently a difference between the two positions and may move the remote control apparatus 110 in consideration of the same, if the image display apparatus corrects the mismatch in this state, the user may feel confused. In this regard, if the user slowly moves the remote control apparatus 110, the image display apparatus 100 does not perform the correction but may perform the correction only when the remote control apparatus 100 quickly moves. For example, in the case of controlling the pointer only by the relative coordinate scheme, when the user directs the remote control apparatus 110 to the screen again in the state in which the remote control apparatus 110 is out of the screen, the pointer is always displayed at the center of the screen, and therefore the user moves the remote control apparatus 110 in consideration of the pointer displayed at the central portion. However, according to the present disclosure, even when the directed position is out of the screen and then enters the screen again, the pointer is not displayed at the center but is displayed by the relative coordinate scheme and then is automatically corrected after a predetermined time. As a result, the user convenience is increased.

If it is determined that the correction is performed, the image display apparatus 100 may differently perform the correction depending on whether the remote control apparatus 110 moves in the direction of the pointer or the opposite direction thereto. For example, if the remote control apparatus 110 moves in the direction of the pointer, the position where the pointer will be displayed may be determined by a scheme of allocating a small weight or subtracting a weight having a predetermined size from the coordinate values of the current position to display the pointer on the screen and if the remote control apparatus 110 moves in the opposite direction thereto, the position where the pointer will be displayed on the screen may be determined by a scheme of allocating a large weight or adding a weight having a predetermined size to the coordinate values of the current position to display the pointer on the screen. Here, the "weight" may refer, for example, to a value allocated to a specific situation (or importance). For example, like the above case, provided that the absolute coordinate values to which the current remote control apparatus 110 directs are (10, 10) and the positions of the pointer displayed on the current screen are (20, 20), when the user moves the remote control apparatus 110 by providing a variation (or movement amount) by 5 in the opposite direction of the pointer, the pointer is displayed at (12, 12) by adding a weight of 3 to the variation to finally apply a variation by 8. If the pointer moves only by the existing relative coordinate scheme, the pointer needs to be positioned at (15, 15), but the present disclosure may allocate the weight to rapidly correct the mismatch. Further, the allocation of the weight may be changed by the system designer as much as he/she wants and therefore the present disclosure is not particularly limited to the above content.

As described above, the image display apparatus 100 performs the operation of correcting the mismatch when the position on the screen to which the user directs the remote control apparatus 110 and the position where the current pointer is displayed mismatch, in which the correction operation is preferably made when the two positions are present on the screen. Further, first displaying the pointer on the screen by the absolute coordinate scheme and then displaying the pointer by the relative coordinate scheme are described above, but even though the pointer is first displayed on the screen by the relative coordinate scheme, when the above-mentioned situations occur, the image display apparatus 100 according to the present disclosure may perform the correction operation according to the present disclosure.

In addition, the present disclosure describes that the correction operation is performed only when the image display apparatus 100 according to the present disclosure satisfies all the preset conditions, but may perform the operation of correcting a mismatch even when satisfying one of several conditions. Here, the "preset condition" may refer, for example, to the conditions associated with the state on (1) whether the position to which the remote control apparatus 110 directs is out of the screen and then enters a screen, (2) whether the distance between the two positions is equal to or more than the first threshold value, (3) whether the variation associated with the motion of the remote control apparatus 110 after the position to which the remote control apparatus 110 directs enters the screen is equal to or more than the second threshold value, and (4) in which direction the remote control apparatus 110 moves and the "preset condition" may include a part or all of the conditions. That is, some of the above (1) to (4) may also correspond to the process of determining the mismatch.

The remote control apparatus 110 includes a sensor determining whether the user holds the remote control apparatus. The sensor may include, for example, a recognition sensor including a pressure sensor recognizing whether the user holds the remote control apparatus 110 based on a pressure, etc., a motion sensor determining whether the motion of the remote control apparatus 110 is generated, and so on. If the signal is received by the sensor, the remote control apparatus 110 may perform the photographing operation using the camera, etc., therein after the predetermined time. That is, the remote control apparatus 110 photographs a front portion (ex. screen) of the image display apparatus 100.

Next, the remote control apparatus 110 analyzes the photographed image to determine at which position the sensing signal output from the image display apparatus 100 is. Further, the analysis may depend on the service providing apparatus 130, which is out of discussion. The image photographed by the remote control apparatus 110 is a still image in a frame unit, and therefore the remote control apparatus 110 may calculate the coordinate information by the absolute coordinate scheme and transmit the calculated coordinate information to the image display apparatus 100. In this case, the image display apparatus 100 may calculate the movement amount (or including a direction) based on the set value for the preset position and the coordinate information received by the remote control apparatus 110 and may use the calculated movement amount for the output of the pointer. Further, the remote control apparatus 110 may use the coordinate information calculated by the photographed image and the set value for the preset position of the sensing sensor 100a stored therein to transmit the position information to the image display apparatus 100 in the form of the calculated movement amount, that is, the variation. These are matters that may be determined when a product is released and therefore will not be particularly limited to any one of the schemes.

For example, it is assumed that the remote control apparatus 110 calculates the variation as the position information and a resolution of the DTV is 1920×1080. In the case of the absolute coordinate scheme of setting the upper left of the screen to be (1, 1), the set value of the preset position for the sensing sensor 100a of FIG. 2 may be coordinate information (1080, 960). If the coordinate values of the sensing signal determined in the photographed image are calculated as (540, 960), the distance may be calculated depending on the formula obtaining the distance d between the two coordinates. The remote control apparatus 110 may provide the calculated distance, that is, the variation to the image display apparatus 100 as the position information.

If the process is completed, that is, if the operation of displaying the pointer by the absolute coordinate scheme is completed, the remote control apparatus 110 operates the sensors therein to provide direction information and movement amount information to the image display apparatus 100 so that the image display apparatus 100 may display the pointer by the relative coordinate scheme. For the information generation, the remote control apparatus 110 includes a 6-axis sensor, that is, a gyro sensor, an accelerator sensor, and so on, and may provide the sensing values for operating the sensors by the relative coordinate scheme to the image display apparatus 100.

The communication network 120 includes all of the wired and wireless communication networks. Here, the wired network may include, for example, and without limitation, the Internet networks such as a cable network and a public switched telephone network (PSTN) and a wireless communication network includes a CDMA, a WCDMA, a GSM, an evolved packet core (EPC), long term evolution (LTE), a Wibro network, etc. Of course, the communication network 120 according to the example embodiment of the present disclosure is not limited thereto and may be used in a cloud computing network, etc., under, for example, the cloud computing environment as a connection network of a next-generation mobile communication system to be implemented in future. For example, when the communication network 120 is a wired communication network, an access point within the communication network 120 may be connected to a switching center, etc., of a telephone station, but when the communication network 120 is a wireless communication network, it may be connected to an SGSN or a gateway GPRS support node (GGSN) to process data or connected to various relay stations such as base station transmission (BTS), NodeB, and e-NodeB to process data.

The communication network 120 may include the access point. The access point includes small base stations such as a femto base station or a pico base station which is mainly installed in a building. Here, the femto or pico base station is classified depending on how many image display apparatuses 100 may be connected, in terms of the classification of the small base station. Of course, the access point includes near field communication modules such as Zigbee and Wi-Fi which perform near field communications with the image display apparatus 100. The access point may use a TCP/IP or a real-time streaming protocol for wireless communications. Here, the near field communications may be performed in various standards of radio frequencies (RFs) such as Bluetooth, Zigbee, infrared data association (IrDA), ultra high frequency (UHF), and very high frequency (VHF), an ultra wideband (UWB), etc., in addition to the Wi-Fi. Therefore, the access point may extract a position of a data packet, designates a best communication path for the extracted position, and transfer a data packet to the next apparatus, for example, the image display apparatus 100 along the designated communication path. The access point may share several lines under the general network environment and may include, for example, a router, a repeater, a relay station, etc.

The service providing apparatus 130 may include a broadcasting server providing a broadcasting service, a search server providing services of professional search portal enterprises, and so on. In other words, the service providing apparatus 130 is preferably operated as an image service source that the user requests according to the present disclosure. Therefore, when the system 90 is configured not to include the communication network 120, the service providing apparatus 130 may be, for example, a blu-ray disk (BD) player or other media apparatuses that are directly operated with the image display apparatus 100.

As the above configuration result, when the user manipulates the remote control apparatus 110, the system 90 may intuitively display the pointer at the user desired position and thus be user-friendly and reduce the number of manipulations, thereby promoting the user convenience.

Figure 3:
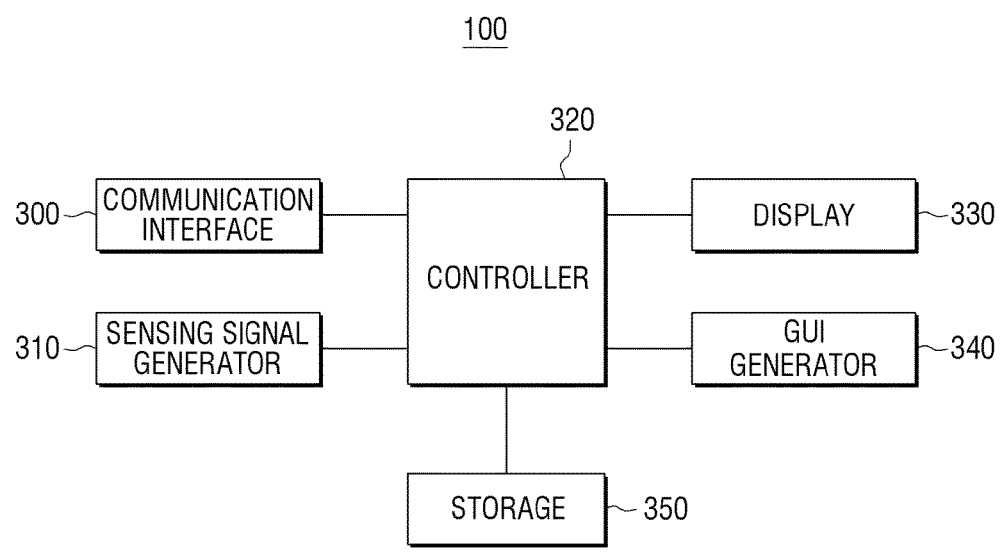
FIG. 3 is a block diagram illustrating an example structure of the image display apparatus illustrated in FIG. 1.

FIG. 3 is a block diagram illustrating an example structure of the image display apparatus illustrated in FIG. 1.

Referring to FIGS. 3 and 1, the image display apparatus 100 according to the present disclosure includes a part or the whole of a communication interface (e.g., including communication circuitry) 300, a sensing signal generator 310, a controller (e.g., including processing circuitry) 320, a display 330, a GUI generator 340, and storage 350.

Herein, the "including a part or the whole" may refer, for example, to a situation in which some components of the GUI generator 340, the storage 350, etc., are omitted in the image display apparatus 100 or may be integrally configured in other components such as the controller 320, etc., and the case in which all of the components described above are included will be described to help sufficient understanding of the present disclosure.

The communication interface 300 may include various communication circuitry that communicates with the service providing apparatus 130 through the communication network 120. By this, the communication interface 300 may receive the image provided from the service providing apparatus 130 to transmit the received image to the controller 320.

Further, the communication interface 300 may receive the position information provided from the remote control apparatus 110 based on the sensing result of the sensing signal generated from the sensing signal generator 310. In this case, the position information may be provided in various forms as mentioned and even though there is no position information, the communication interface 300 may receive various forms of signals from the remote control apparatus 110. For example, a signal notifying that there is no position information is representative.

The sensing signal generator 310 includes an infrared sensor and is preferably a light emitting element. According to the present disclosure, the sensing signal generator 310 may generate light within an infrared waveband not to allow a user to recognize the light emitted state. Alternatively, the light may be periodically generated. Therefore, a viewer is not disturbed to view an image even though the infrared light is generated.

The sensing signal generator 310 may be positioned at a lower center of the screen as illustrated in FIG. 2 according to the present disclosure. However, this is only an option, and therefore the sensing signal generator 310 may be positioned anywhere, for example, at an edge.

The controller 320 may include various processing circuitry to control the general operations of the components in the image display apparatus 100. For example, when the image signal is received through the communication interface 300, the controller 320 may process the received image signal and display the processed signal on the display 330. By the process, various operations of separating the received image signal into a video signal, an audio signal, and additional information, decoding the separated video/audio signal, performing post-processing (ex. scaling of the video signal, amplification of the audio signal, or the like) on the decoded signal are performed, and then the image may be displayed on the display 330 and audio may be output to an audio output (not illustrated).

By the process, the controller 320 performs a control to operate the GUI generator 340 to allow a pointer to be displayed on the screen of the display 330 when there is the position information received through the communication interface 300. For example, the pointer output from the GUI generator 340 is synthesized (combined) with the video image output to the display 330 and displayed. In this case, the controller 320 determines a position to which the pointer will be output based on the position information received by the communication interface 300 and outputs the pointer to the determined position.

For example, the video image output to the display 330 and the GUI image (including the pointer) output from the GUI generator 340 may form different layers. Therefore, the GUI generator 340 may pre-store the GUI image depending on the coordinate information and then output a specific GUI image including a pointer matched with the position information input from the controller 320 and the controller 320 may synthesize the GUI image with the specific GUI image and output the synthesized image to the display 330. The image processing may be performed by various schemes and therefore will be no longer described.

As described above, the display 330 displays the image processed by the controller 320 on the screen. In this case, the pointer first displayed on the screen is output based on the absolute coordinate scheme according to the present disclosure and the subsequent movement of the pointer is made based on the relative coordinate scheme.

The GUI generator 340 outputs the pre-stored GUI image according to the control of the controller 320. At this point, the GUI image may be one image including the pointer but may be a plurality of unit frame images in which the position of the pointer is positioned by coordinates. For example, in the case of one image, the position of the pointer may move depending on the coordinate information to be output and when the pointer is stored by coordinates, the GUI generator 340 may output the unit frame image matched with the position information provided from the controller 320.

The storage 350 may store various data or information processed by the controller 320 and then output the data or information when there is the request of the controller 320. Further, the storage 350 may pre-store the position for the sensing signal generator 310 of the image display apparatus 100 as the set value. For example, when the controller 320 determines the position of the pointer output from the GUI generator 340, the storage 350 may provide the stored set value according to the control of the controller 320.

Reviewing in more detail the controller 320, the controller 320 may be differently operated depending on in what form the remote control apparatus 110 is defined to transmit the position information. In other words, since the controller 320 already knows the information on the position of the infrared sensor as the sensing signal generator 310, when the position information is received in the form of the movement amount (or vector having the size and direction information), the controller 320 determines the position of the pointer only by considering when the pointer is displayed. On the other hand, when the remote control apparatus 110 provides the position information in the form of the coordinate values, the controller 320 may use the set value pre-stored in the storage 350 to calculate the movement amount and may control the display 330 to determine the position of the pointer based on the calculated movement amount to output the image. The scheme is determined at the time of the product design, and therefore the present disclosure is not particularly limited to the specific scheme.

Meanwhile, the controller 320 may include a processor including processing circuitry for performing a substantial control function and a memory that stores a program (or algorithm) calculating the movement amount and executes the stored program according to the control of the processor. Therefore, the operation of the controller 320 may be the operation of the processor. The detailed content will be again described with reference to FIG. 7.

Figure 4:
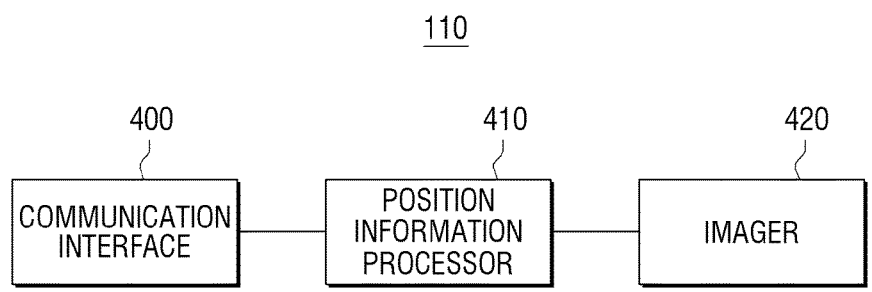
FIG. 4 is a block diagram illustrating an example structure of a remote control apparatus of FIG. 1.

FIG. 4 is a block diagram illustrating an example structure of a remote control apparatus of FIG. 1.

Referring to FIGS. 4 and 1, the remote control apparatus 110 according to the present disclosure includes a part or the whole of a communication interface (e.g., including communication circuitry) 400, a position information processor 410, and an imager (e.g., including imaging circuitry) 420. Here, the "including a part or the whole" is the same as the foregoing meaning.

The communication interface 400 may include various communication circuitry that communicates with the image display apparatus 100. For this purpose, the communication interface 400 may include various communication circuitry, such as, for example, and without limitation, a communication module that performs near field communications such as WiFi and Bluetooth, or the like.

The communication interface 400 transmits the position information provided from the position information processor 410 to the image display apparatus 100. By the process, the communication interface 400 may transmit a signal notifying that there is no change in position information to the image display apparatus 100.

The position information processor 410 may include various circuitry configured to generate the position information by the absolute coordinate scheme according to the present disclosure. In other words, the position information processor 410 analyzes the photographed image provided from the imager 420 and detects the position of the sensing signal generated for the image display apparatus 100. Further, the position information processor 410 extracts the coordinate information on the detected position of the sensing signal. For example, the coordinate information may be acquired by masking, that is, covering the photographed image with a masking signal (or film) in which the coordinate information is defined. Next, the position information processor 410 may transmit the extracted coordinate information as the position information to the image display apparatus 100 through the communication interface 400.

Further, the position information processor 410 may pre-store, for example, the information on the position of the infrared sensor and determine the movement amount using the extracted coordinate information and the pre-stored set value, that is, the movement amount based on the preset position to provide the determined movement amount to the image display apparatus 100 as the position information.

When it is determined that a user holds the remote control apparatus 110, the imager 420 may be operated according to the control of the position information processor 410. Actually, it may be determined whether the user holds the remote control apparatus 110 by the pressure sensor, the motion sensor, or the like.

However, in addition thereto, the determination on whether the user holds the remote control apparatus 110 may be made by various schemes. For example, one of the schemes is a case in which the image display apparatus 100 transmits the information that the user holds the remote control apparatus 110. In other words, since the image display apparatus 100 is highly likely to have a camera if considering several aspects such as a function while satisfying the consumer demand for products, if it is determined that the user holds the remote control apparatus 100 as the analysis result of the image photographed by the camera, the image display apparatus 100 may notify the remote control apparatus 110 of the determination. When the notification signal is received, the imager 420 may be operated according to the control of the position information processor 410.

Figure 5:
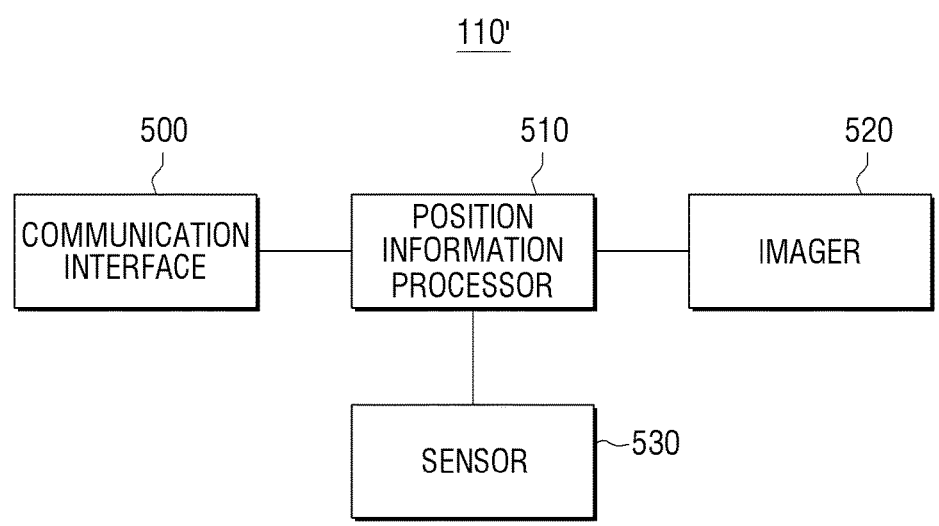
FIG. 5 is a block diagram illustrating another example structure of the remote control apparatus illustrated in FIG. 1.

FIG. 5 is a block diagram illustrating another example structure of the remote control apparatus illustrated in FIG. 1.

Referring to FIGS. 5 and 1, a remote control apparatus 110' according to another example embodiment of the present disclosure includes a part or the whole of a communication interface (e.g., including communication circuitry) 500, a position information processor 510, an imager (e.g., including imaging circuitry) 520, and a sensor 530. Here, the "including a part or the whole" is the same as the foregoing meaning.

The primary difference in that the remote control apparatus 110' illustrated in FIG. 5 and that illustrated in FIG. 4, is that the FIG. 5 embodiment may directly sense its own motion.

In other words, when there is no motion by a user, the remote control apparatus 110' of FIG. 5 is operated in a sleep mode to interrupt power from a power supply unit (not illustrated) like a battery to the communication interface 500 and the imager 520. Therefore, the power of the power supply unit may be supplied only to the position information processor 510 and the sensor 530. When the user holds the remote control apparatus 110', the position information processor 510 may operate the imager 520 in an active mode. Further, after the predetermined time lapses, the position information processor 510 may control the imager 520 to perform the photographing operation.

The following operations are not so different from those of the position information processor 410 of FIG. 4, but the position information processor 510 of FIG. 5 may additionally provide the position information for controlling the pointer by the relative coordinate scheme to the image display apparatus 100. For this purpose, the position information processor 510 may control the sensor 530 to acquire the sensing values and provide the acquired sensing values to the image display apparatus 100 as the position information.

The sensor 530 may include various kinds of sensors. For example, the sensor 530 may include the pressure sensor recognizing when the user holds the remote control apparatus 110' and include the 6-axis sensor, that is, the gyro sensor and the accelerator sensor for controlling the pointer by the relative coordinate scheme. The sensor may generate the sensing values such as the moving direction and the moving distance of the remote control apparatus 110' and provide the generated sensing values to the position information processor 510.

Except for the aspect, the communication interface 500 and the position information processor 510 of FIG. 5 are not so different from the communication interface 400 and the position information processor 410 of FIG. 4 and therefore the content thereof will be replaced by the foregoing content.

Figure 6:
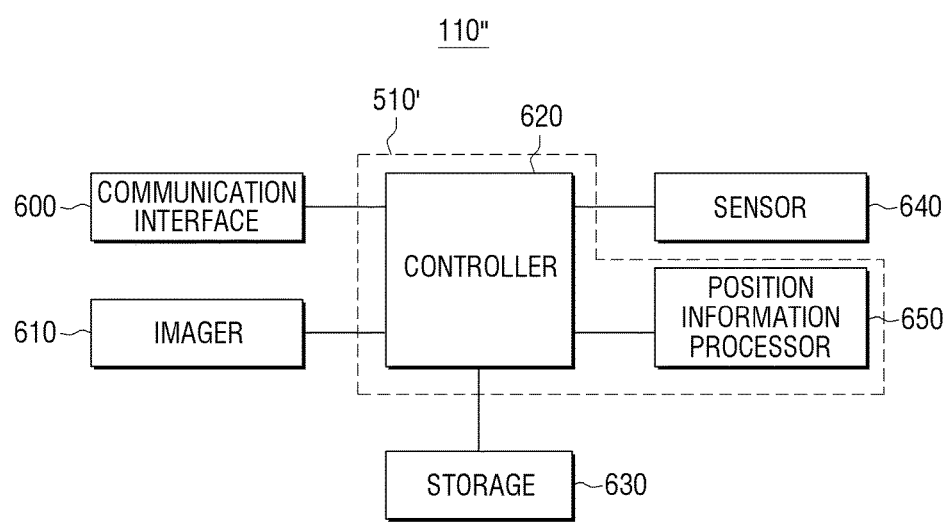
FIG. 6 is a block diagram illustrating still another example structure of the remote control apparatus illustrated in FIG. 1.
Figure 7:
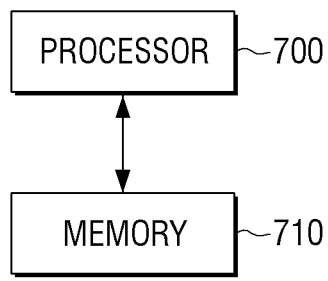
FIG. 7 is a diagram illustrating an example structure of a controller of FIG. 6.

FIG. 6 is a block diagram illustrating still another example structure of the remote control apparatus illustrated in FIG. 1 and FIG. 7 is a diagram illustrating an example structure of a controller of FIG. 6.

Referring to FIG. 6, a remote control apparatus 110" according to still another example embodiment of the present disclosure includes a part or the whole of a communication interface (e.g., including communication circuitry) 600, an imager (e.g., including imaging circuitry) 610, a controller (e.g., including processing circuitry) 620, a storage 630, a sensor 640, and a position information processor 650. Here, the "including a part or the whole" is the same as the foregoing meaning.

The remote control apparatus 110" illustrated in FIG. 6 similar to the remote control apparatus 110' illustrated in FIG. 5. However, the remote control apparatus 110" of FIG. 6 has a difference from the remote control apparatus 110' of FIG. 5 in that the position information processor 510 of FIG. 5 is physically separated into the controller 620 performing a control function and the position information processor 650 generating the position information.

In other words, the position information processor 510 of FIG. 5 may execute a control function and an operation of generating position information using one SW, that is, a program, but the position information processor 510 of FIG. 5 is different from that of FIG. 6 in which the controller 620 may perform the control function and the position information processor 650 may perform the operation of generating position information.

Briefly describing again, the position information processor 650 calculates the coordinate information of the sensing signal detected from the photographed image provided from the imager 610 to output the pointer to the screen of the image display apparatus 100 by the absolute coordinate scheme and uses the determined coordinate information as the position information.

Except for the aspect, the communication interface 600, the imager 610, the controller 620, the storage 630, the sensor 640, and the position information processor 650 are similar the communication interface 500, the position information processor 510, the imager 520, and the sensor 530 of FIG. 5, and therefore the content thereof will be replaced by the foregoing content.

Meanwhile, the controller 620 of FIG. 6 may include a processor 700 and a memory 710 as illustrated in FIG. 7. The processor 700 may include various processing circuitry that performs the control function as described above. Further, the processor 700 may load the program stored in the position information processor 650 of FIG. 6 to the memory 710 when the remote control apparatus 110" is initially driven. Next, to perform the operation of generating position information, it is enough for the processor 700 to execute the program stored in the memory 710. As the result, the remote control apparatus 110" may increase a data processing rate over FIG. 6.

Figure 8:
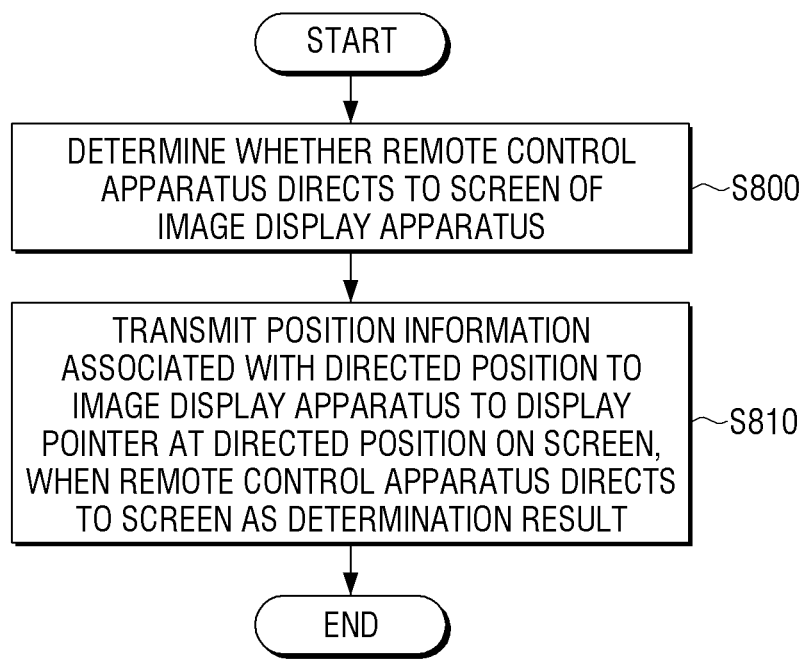
FIG. 8 is a flowchart illustrating an example driving process of the remote control apparatus according to an example embodiment of the present disclosure.

FIG. 8 is a flowchart illustrating an example driving process of the remote control apparatus according to an example embodiment of the present disclosure.

For convenience of explanation, referring to FIGS. 8 and 1, the remote control apparatus 110 according to the present disclosure determines whether the remote control apparatus 110 indicates, that is, directs to the screen of the image display apparatus 100 (S800). For example, it may be determined whether the remote control apparatus 110 directs to the screen by, for example, analyzing the image obtained by photographing the image display apparatus 100 by the remote control apparatus 110. For example, if the sensing signal, that is, the infrared signal provided from the image display apparatus 100 within the photographed image is sensed, it may be determined that the remote control apparatus 110 directs to the screen.

As the determination result, if it is determined that the remote control apparatus 110 directs to the screen, the remote control apparatus 110 transmits the position information associated with the indicated (e.g., directed) position to the image display apparatus 100 to display the pointer at the indicated position of the screen (S810).

Next, the remote control apparatus 110 transmits the position information for moving the pointer displayed on the image display apparatus 100 by the relative coordinate scheme to the image display apparatus 100. For this purpose, the remote control apparatus 110 may transmit the sensing values sensed by the sensor therein as the position information.

Figure 9:
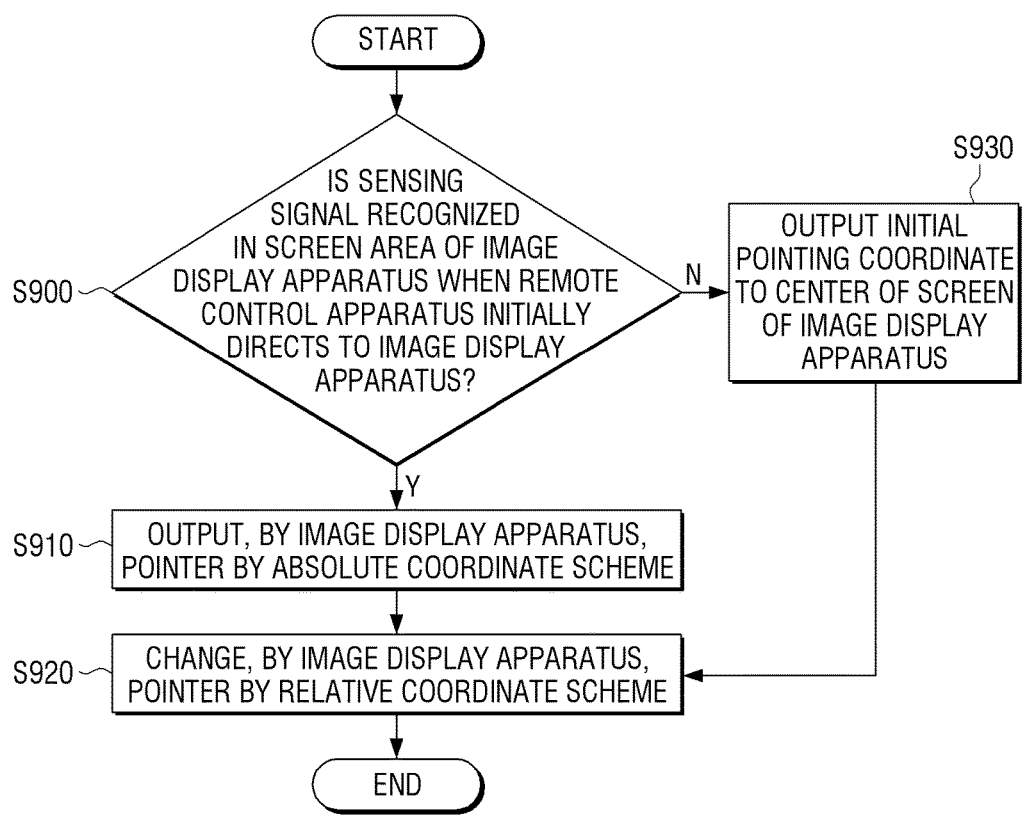
FIG. 9 is a flowchart illustrating an example driving process of a remote control apparatus according to another example embodiment of the present disclosure.

FIG. 9 is a flowchart illustrating an example driving process of a remote control apparatus according to another example embodiment of the present disclosure.

For convenience of explanation, referring to FIGS. 9 and 1, the remote control apparatus 110 according to another example embodiment of the present disclosure determines whether the sensing signal (ex. infrared signal) is recognized in the screen area of the image display apparatus 100 when the remote control apparatus 110 initially directs to the image display apparatus 100 (S900). That is, the remote control apparatus 110 determines whether the sensing signal is present within the image obtained by photographing the image display apparatus 100.

Next, if the sensing signal is recognized in the screen area, the remote control apparatus 110 determines the coordinate information of the sensing signal from the photographed image (by the absolute coordinate scheme) and uses the determined coordinate information to control the output of the pointer of the image display apparatus 100 (S910). For this purpose, the remote control apparatus 110 may provide the calculated coordinate information or the information in the changed form thereof to the image display apparatus 100 as the position information.

When the initial output of the pointer is performed on the screen of the image display apparatus 100, the remote control apparatus 110 is operated so that the subsequent movement of the pointer is made by the relative coordinate scheme (S920). For this purpose, the remote control apparatus 110 may transmit the sensing values generated by the gyro sensor and the accelerator sensor to the image display apparatus 100 as the position information.

Meanwhile, in step S900, if it is determined that the sensing signal is not recognized in the screen area of the image display apparatus 100, the remote control apparatus 110 is operated to output the pointer to the center of the screen of the image display apparatus 100 (S930).

For this purpose, the remote control apparatus 110 may transmit the coordinate information corresponding to the center of the screen to the image display apparatus 100, but may merely transmit only a signal which is not recognized in the screen area of the image display apparatus 100 from the remote control apparatus 110 to the image display apparatus 100 depending on previous agreements of the image display apparatus 100 and the remote control apparatus 110 to perform higher-speed information processing.

Even after the remote control apparatus is operated to display the pointer at the center of the screen, like step S920, the remote control apparatus 110 may transmit the sensing values sensed by the sensor to the image display apparatus 100 so that the subsequent movement of the pointer is made by the relative coordinate scheme.

Meanwhile, as described above, the remote control apparatus 110 does not include the imager such as the camera and only the image display apparatus 100 may include the imager such as the camera.

In this case, it may be notified from the image display apparatus 100 to the remote control apparatus 110 whether the remote control apparatus 110 directs to the screen area of the image display apparatus 110 by analyzing the photographed image. Here, the "screen area" may be understood as including the margin, that is, the error range.

According to the above notification, the remote control apparatus 110 may operate the gyro sensor and the accelerator sensor therein to transmit the sensing values to the image display apparatus 100. The sensing values may be used so that the image display apparatus 100 displays the pointer by the relative coordinate scheme.

Figure 10:
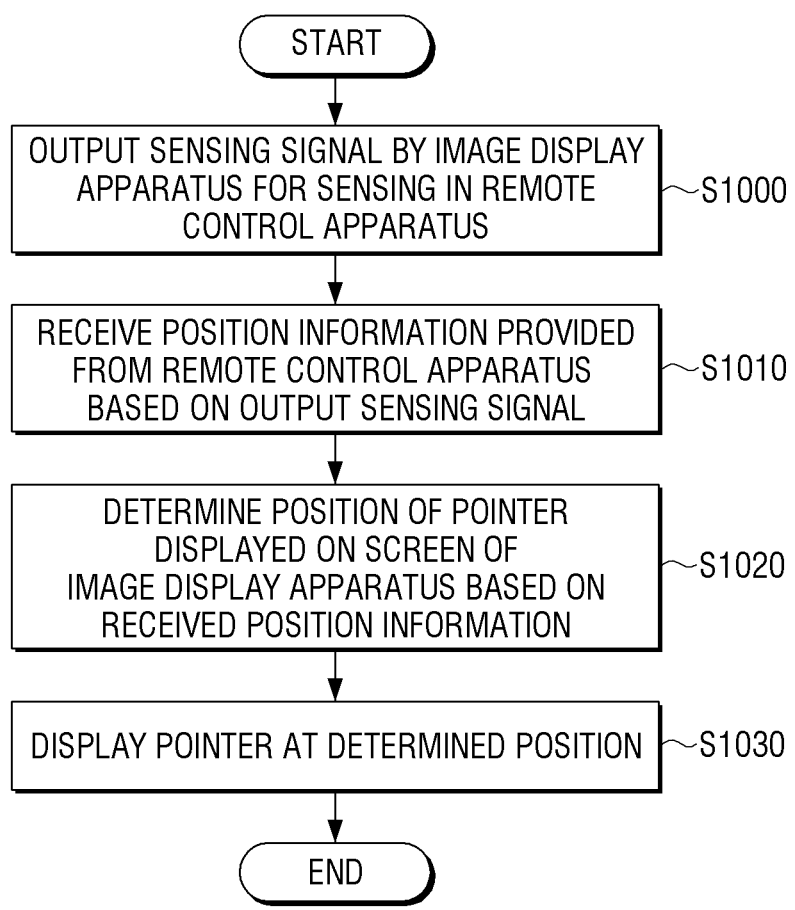
FIG. 10 is a flowchart illustrating an example process of driving an image display apparatus according to a first example embodiment of the present disclosure.

FIG. 10 is a flowchart illustrating an example driving process of the image display apparatus according to an example embodiment of the present disclosure.

For convenience of explanation, referring to FIGS. 10 and 1, the image display apparatus 100 according to the present disclosure outputs the sensing signal sensed by the remote control apparatus 110 (S1000). Here, the sensing signal may be preferably an infrared signal.

Next, the image display apparatus 100 receives the position information provided from the remote control apparatus 110 based on the output sensing signal (S1010). In this case, the received position information may be the coordinate information or the distance value representing the movement amount.

Further, the image display apparatus 100 determines the position of the pointer displayed on the screen of the image display apparatus 100 based on the received position information (S1020). Here, the pointer corresponds to a visual mark or a signal for selecting items displayed on the screen. The image display apparatus 100 already knows the set value for the preset position of, for example, the infrared sensor outputting the sensing signal, and therefore may determine the position of the pointer based on the set value thereof and the received position information. As described above, when there are two coordinates, the image display apparatus 100 determines the distance value from the coordinates and applies the distance value and the direction based on the preset position to determine the position of the pointer. For this purpose, the image display apparatus 100 may execute a separate program to determine the position of the pointer.

Further, the image display apparatus 100 displays the pointer at the determined position (S1030).

The process is performed by using the output sensing signal to allow the remote control apparatus 110 to provide the sensing signal in the photographed image and the coordinate information generated by the absolute coordinate as the position information, which may be described as the output of the pointer by the absolute coordinate scheme.

When the initial output process of the pointer is performed, the image display apparatus 100 outputs the pointer by the relative coordinate scheme depending on the sensing values sensed by the sensor of the remote control apparatus 110. For example, if the initial output position of the pointer is determined based on the absolute coordinate scheme, the position of the pointer is changed by continuously reflecting the direction information and the distance information based on the determined initial output position.

Meanwhile, although not illustrated in the drawings, the image display apparatus 100 may interwork with the remote control apparatus 110 that does not include the imager such as the camera.

In this case, the image display apparatus 100 may drive the camera to determine whether the remote control apparatus 110 directs to the screen area based on the analysis of the photographed image. At this point, the determination result may be notified to the remote control apparatus 110. Therefore, the image display apparatus 100 may receive the sensing values sensed by the gyro sensor, or the like from the remote control apparatus 110.

Further, the image display apparatus 100 may detect the direction in which the remote control apparatus 100 directs to the screen when analyzing the photographed image and estimates the directed direction and the directed point by determining, for example, an angle and initially output the pointer by the absolute coordinate scheme based on the estimated direction and point. Next, the pointer may move by the relative coordinate scheme using the received sensing values.

As such, to output the pointer to the screen by the absolute coordinate scheme and the relative coordinate scheme, the detailed operation of the image display apparatus 100 may be slightly different depending on how to interwork the image display apparatus 100 with the remote control apparatus 110 using hardware resources, or the like. Therefore, the present disclosure is not particularly limited to the above contents.

Figure 11:
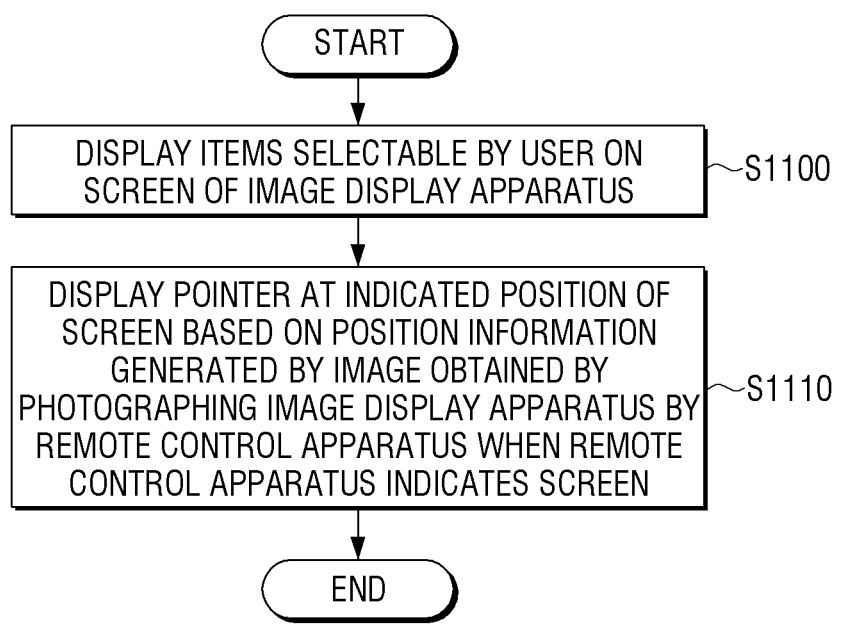
FIG. 11 is a flowchart illustrating an example screen display method of an image display apparatus according to an example embodiment of the present disclosure.

FIG. 11 is a flowchart illustrating an example screen display method of the image display apparatus according to an example embodiment of the present disclosure.

For convenience of explanation, referring to FIGS. 11 and 1, the image display apparatus 100 according to the present disclosure displays the items selectable by the user on the screen of the image display apparatus 100 (S1100). In this case, the items may be items for selecting a specific program in EPG and may include various things such as a specific product for Internet shopping.

Next, when the remote control apparatus 110 indicates the screen, the image display apparatus 100 displays the pointer at the indicated position of the screen based on the position information generated by the image obtained by photographing the image display apparatus 100 by the remote control apparatus 110 (S1110).

That is, when the user directs to the remote control apparatus 110, the image display apparatus 100 immediately displays the pointer at the directed direction and position, not at the center portion of the screen.

By this, the image display apparatus 100 more intuitively displays the pointer on the screen and thus the user may feel that the image display apparatus 100 is more user-friendly.

For example, assume that the user selects a menu command calling the EPG through the remote control apparatus 110. Next, the remote control apparatus 110 displays the pointer by the absolute coordinate scheme as described above to initially output the pointer to the screen. For this purpose, the remote control apparatus 110 may use the photographed image.

So far, the case in which when the user holds the remote control apparatus 110 of FIG. 1 and then initially directs the remote control apparatus 110 to the screen of the image display apparatus 100, the image display apparatus 100 displays the pointer on the screen by the absolute coordinate scheme is mainly described. Further, FIG. 3 also illustrates the structure of the image display apparatus 100.

Hereinafter, when the position to which the remote control apparatus 110 directs and the position of the pointer displayed on the current screen mismatch each other on the screen of the image display apparatus 100 according to another example embodiment of the present disclosure, the correction of the mismatch will be described. Of course, according to another example embodiment of the present disclosure, as described above, after the pointer is displayed by the absolute coordinate scheme as described above, the position to which the remote control apparatus 110 directs and the position of the pointer displayed on the current screen may mismatch each other on the screen but even when the pointer displayed on the screen of the image display apparatus 100 is controlled only by the relative coordinate scheme without using the absolute coordinate scheme, the above mismatch problem may occur. Therefore, the present disclosure is not particularly limited to based on which coordinate scheme the mismatch between the position of the pointer and the direction position occurs.

Figure 12:
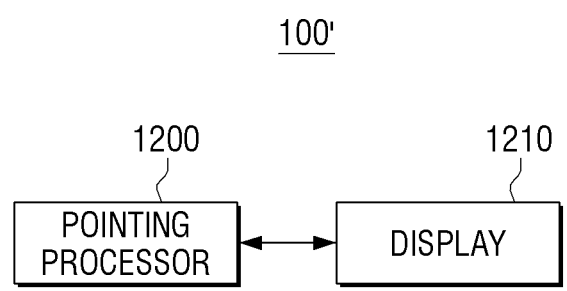
FIG. 12 is a block diagram illustrating an example structure of an image display apparatus according to another example embodiment of the present disclosure.

FIG. 12 is a block diagram illustrating an example structure of an image display apparatus according to another example embodiment of the present disclosure.

As illustrated in FIG. 12, the image display apparatus 100' according to another example embodiment of the present disclosure includes a part or the whole of a pointing processor 1200 and a display 1210.

Herein, the "including a part or the whole" may refer, for example, to a situation in which the pointing processor 1200 may be integrally configured in the display 1210, or the like and the case in which all of the components described above are included will be described to help sufficient understanding of the present disclosure.

First, the pointing processor 1200 may include various processing circuitry configured to control the general operation of the display 1210 and control the output of the pointer displayed on the screen. In other words, when the pointer is displayed on the display 1210 according to the system design scheme, the pointing processor 1200 may output the pointer by the relative coordinate scheme or output the pointer by the combination of the absolute coordinate scheme and the relative coordinate scheme as described above. For this purpose, the pointing processor 1200 may merely output the pointer to the screen of the display 1210 based on various information (or data) provided from the remote control apparatus 110 of FIG. 1, but may also output the pointer to the screen by the operation of directly generating the coordinate information, or the like.

For example, if the output of the pointer is controlled by the relative coordinate scheme, the pointing processor 1200 receives the signal that the user holds the remote control apparatus 110 from the remote control apparatus 110 and may output the pointer to the center of the screen of the display 1210 based on the received signal. On the other hand, if it is determined that the user holds the remote control apparatus 110 and then directs to the screen of the display 1210, the pointer may be output to the screen by the absolute coordinate scheme and then the pointer may be controlled by the relative coordinate scheme. The latter is sufficiently described above.

As such, the pointing processor 1200 may determine whether the situation that the pointer displayed on the current screen and the position on the screen to which the user directs the remote control apparatus 110 mismatch each other occurs in the state in which the pointer is output to the screen by various schemes. For example, the case in which the remote control apparatus 110 is out of the screen area while he/she moves the remote control apparatus 110 and then directs to the screen area again is a preferable example. This is sufficiently described above with reference to FIG. 1 and therefore the description thereof will be no more described.

If the mismatch occurs between the two positions, the pointing processor 1200 may check the mismatch degree. For example, the pointing processor 1200 may pre-store the determined absolute coordinate values during the process of outputting the pointer to the screen. By this, the coordinate values for the position to which the remote control apparatus 110 directs and the coordinate values where the current pointer is output to the screen may be known already. Therefore, if the position to which the remote control apparatus 110 directs is changed from the state in which it is out of the screen to the screen, the absolute coordinate values corresponding to pixels of the entering side and the variation of the remote control apparatus 110 may be calculated to derive the directed absolute coordinate values on the current screen. Further, the pointing processor 1200 knows the absolute coordinate values for the position of the pointer displayed on the current screen, and therefore may also derive the absolute coordinate values for the position of the current pointer by adding the variation to the value.

The pointing processor 1200 may determine the mismatch degree, that is, whether the distance is out of the error range or whether the variation of each variable is equal to or more than the threshold value, based on the two coordinate values each derived. In other words, if the determined distance is smaller than the threshold value or the variation of each variable is smaller than the threshold value, the pointer may be continuously controlled by the relative coordinate scheme without the separate correction procedure. On the other hand, if the calculated distance is larger than the threshold value, the pointing processor 1200 may correct the mismatch by the preset scheme. In other words, when outputting the pointer to the screen, the pointing processor 1200 outputs the pointer to the position to which the weight is allocated.

Prior to the above process, the pointing processor 1200 confirms the position to which the remote control apparatus 110 is directed on the screen and then may further determine whether the motion variation of the remote control apparatus 110 is large or small. In other words, the mismatch correction operation may be performed when the variation is large but the mismatch correction operation may not be performed when the variation is small. In other words, if the output of the pointer is controlled by the correction in the state in which the user knows the mismatch, the output of the pointer is not controlled as much as the user wants, and therefore the user may feel slightly uncomfortable in the control of the pointer. In this regard, when the user slowly controls the pointer, more accurately, when the remote control apparatus 110 moves having less variation, the correction of the mismatch may not be performed.

Further, the pointing processor 1200 performs the correction operation of the mismatch when the variation is large but may perform the correction by different schemes when the remote control apparatus 110 moves in the direction in which the pointer is present and when the remote control apparatus 110 moves in the opposite direction to the direction. In other words, when the position to which the remote control apparatus 110 is directed on the screen moves in the opposite direction, a large weight is allocated and thus the pointer quickly follows the position to which the pointer directs to be output to the screen, and when the position to which the remote control apparatus 110 is directed on the screen moves in the direction in which the pointer is present, the pointer may be output to the directed position by a scheme of allocating a small weight or subtracting the preset weight. The scheme may be changed by a designer without limitation, and therefore is not particularly limited thereto.

Figure 13:
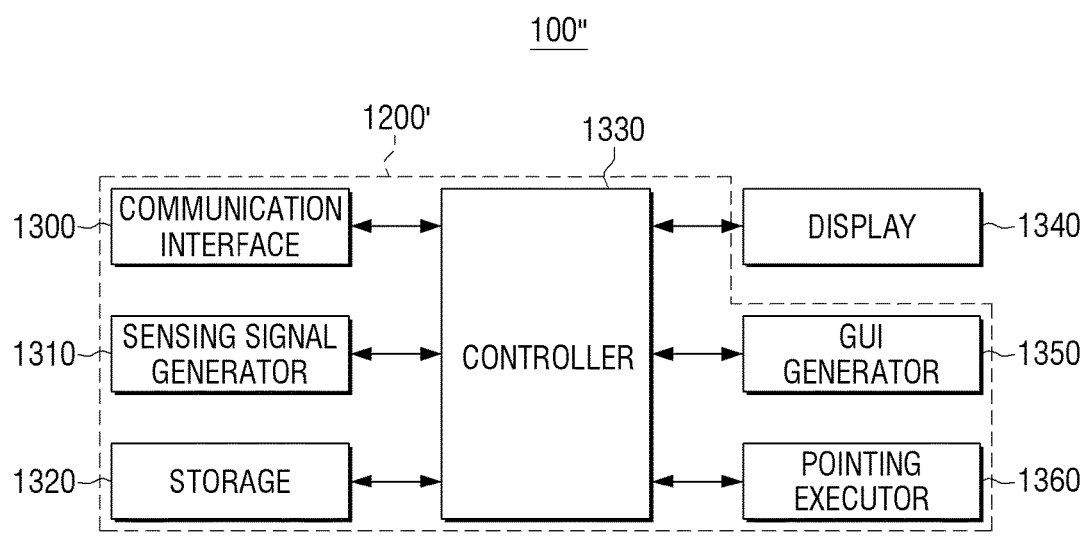
FIG. 13 is a block diagram illustrating an example structure of an image display apparatus according to still another example embodiment of the present disclosure.

Meanwhile, the pointing processor 1200 according to the example embodiment of the present disclosure may perform both of the control operation and the correction operation in a software scheme as illustrated in FIG. 12, which may be advantageous in costs. If the pointing processor 1200 is configured in hardware, the structure as illustrated in FIG. 13 to be described below is possible, but it may also have the structure of the controller 320 and the GUI generator 340 as illustrated in FIG. 3. In this case, the controller 320 and/or the GUI generator 340 may perform the correction operation according to the example embodiment of the present disclosure.

The display 1210 may output the pointer to the screen according to the control of the pointing processor 1200 and may output the pointer to the screen according to the control of the pointing processor 1200 based on the mismatch correction operation. The position where the user directs the remote control apparatus 110 to the screen is not displayed on the display 1210, and therefore only the pointer may be displayed on the screen. Except for the aspect, the display 1210 of FIG. 12 is not so different from the display 330 of FIG. 3, and therefore the detailed content thereof will be replaced by the foregoing content.

FIG. 13 is a block diagram illustrating an example structure of an image display apparatus according to still another example embodiment of the present disclosure.

Referring to FIG. 13, an image display apparatus 100" according to still another example embodiment of the present disclosure includes a part or the whole of a communication interface 1300, a sensing signal generator 1310, a storage 1320, a controller 1330, a display 1340, a GUI generator 1350, and a pointing executor 1360. Here, the "including a part or the whole" is the same as the foregoing meaning.

The image display apparatus 100" illustrated in FIG. 13 similar to the image display apparatuses 100 and 100' illustrated in FIG. 3 and/or FIG. 12. However, if the pointing processor 1200 of FIG. 12 performs both of the control function and the correction operation in a software manner, it may be considered that FIG. 13 divides the control function and the correction operation in a hardware manner to perform the dualized operations.

In other words, the controller 1330 of FIG. 13 may control the pointing executor 1360 to perform various operations such as determining the correction operation of the mismatch, that is, the absolute coordinate values, determining the distance (or variations of each variable), or the like and may receive only the result and control display 1340 based on the received result.

Meanwhile, the controller 1330 may load the program stored in the pointing executor 1360 into the memory at an initial operation of the image display apparatus 100" and then execute the program to perform the above operations. The structure of the controller 1330 is already described with reference to FIG. 7 and therefore the content thereof is no longer described.

Except for the aspect, various components illustrated in FIG. 13 are not so different from the operations of the components illustrated in FIG. 3 or 12 and therefore the detailed content thereof will be replaced by the foregoing content.

Figure 14A:
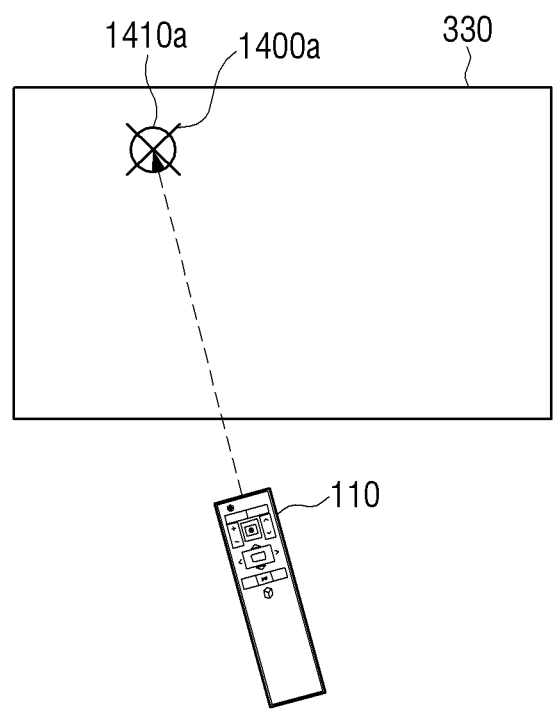
FIGS. 14A, 14B and 14C are diagrams illustrating an example screen display method of an image display apparatus according to another example embodiment of the present disclosure.
Figure 14B:
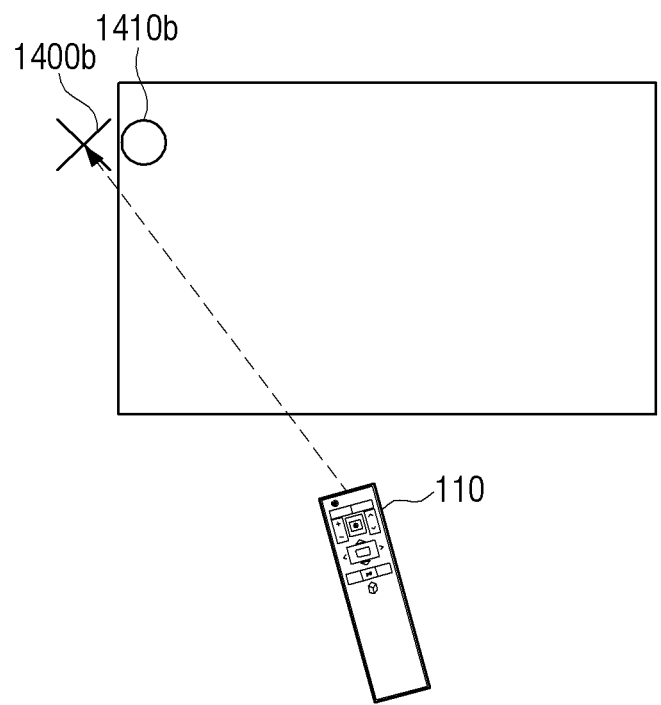
Figure 14C:
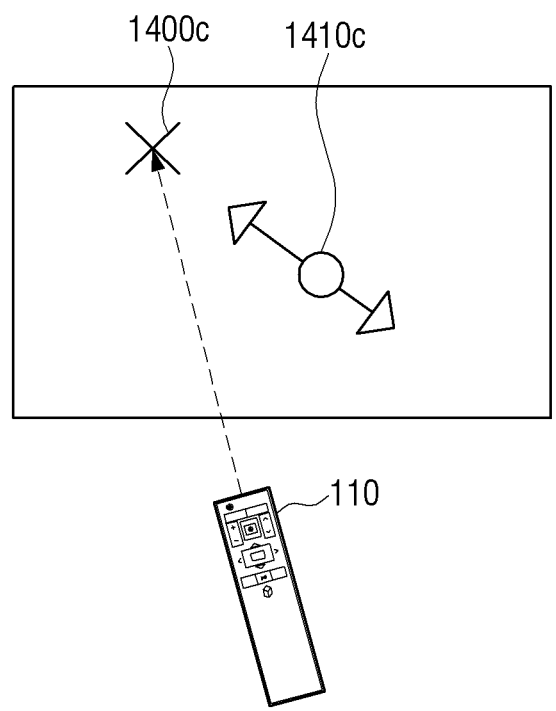

FIGS. 14A, 14B and 14C are diagrams illustrating an example screen display method of an image display apparatus according to another example embodiment of the present disclosure.

For convenience of explanation, referring to FIGS. 14A-14C and 1, the image display apparatus 100 according to the example embodiment of the present disclosure may display a pointer 1410a at the corresponding position by the absolute coordinate scheme when the user holds the remote control apparatus 110 and then directs the remote control apparatus 110 to a designated position 1400a of the screen as illustrated in FIG. 14A.

Next, when a position 1400b to which the remote control apparatus 110 directs is out of the screen, the image display apparatus 100 displays a pointer 1410b at an edge in the direction in which it is out of the screen. In the process, the image display apparatus 100 may frequently store the information on the position to which the remote control apparatus 110 directs and the position to which the pointer is output as the absolute coordinate values and update the stored information. Further, the image display apparatus 100 cannot know to which position the remote control apparatus 110 directs when the directed position is out of the screen, the absolute coordinate values for the outermost pixel in the direction in which the remote control apparatus 110 is out of the screen may be stored as the position information.

In this process, if the user directs the remote control apparatus 110 to the screen again, the image display apparatus 100 knows that the remote control apparatus 110 directs to the screen again and may calculate each of the pre-stored absolute coordinate values and variations to calculate new absolute coordinate values. Of course, the position of the pointer displayed on the screen and the position to which the remote control apparatus 110 directs may be different depending on how much the user gives a variation to the remote control apparatus 110, but in the process, as illustrated in FIG. 14C, it is clear that a mismatch between two positions 1400c and 1410c may occur.

The image display apparatus 100 may determine each of the new absolute coordinate values and use the determined absolute coordinate values to determine the distance (or variations for each variable) to determine how large the mismatch degree is. As the determination result, if the mismatch degree is large, the image display apparatus 100 may perform the operation of correcting the mismatch.

In this process, the image display apparatus 100 may further determine whether the variation for the motion of the remote control apparatus 110 is larger than the threshold value after the directed position enters the screen and may correct the mismatch depending on the preset various conditions such as differently performing the scheme of allocating a weight depending on the direction in which the motion is generated.

As such, the image display apparatus 100 may provide the more intuitive pointing use experience to the user by quickly correcting a position of a cursor, that is, a pointer to the point on the screen to which the user directs the remote control apparatus 110.

Figure 15:
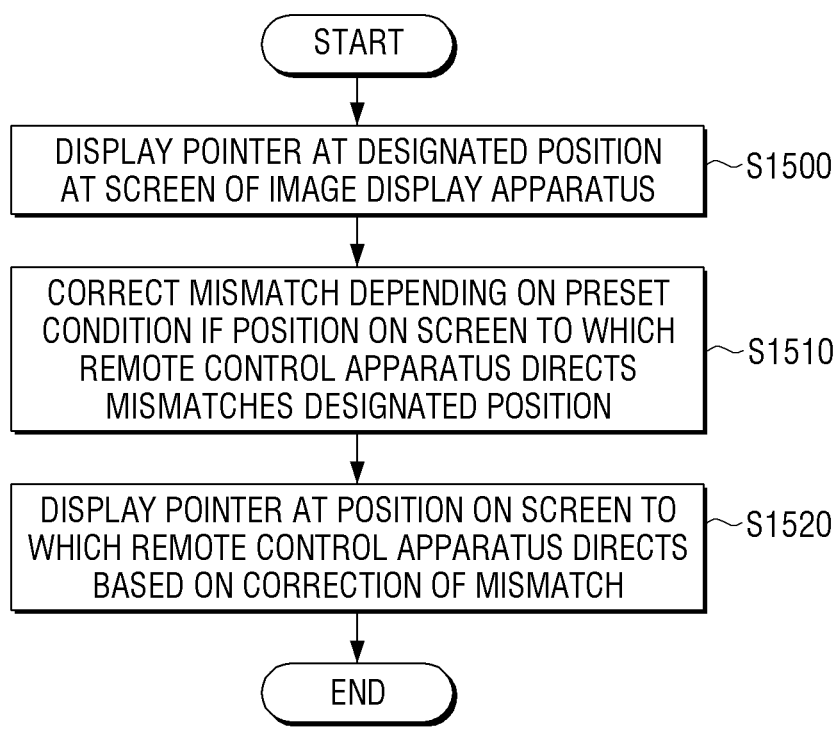
FIG. 15 is a flowchart illustrating an example driving process of an image display apparatus according to another example embodiment of the present disclosure.

FIG. 15 is a flowchart illustrating an example driving process of an image display apparatus according to another example embodiment of the present disclosure.

For convenience of explanation, referring to FIGS. 15 and 1, the image display apparatus 100 according to the example embodiment of the present disclosure displays the pointer on the position designated on the screen (S1500). The display may be based on the relative coordinate scheme that outputs the pointer to the center of the screen and may also be based on the absolute coordinate scheme that outputs the pointer at the position on the screen to which the user directs the remote control apparatus 110. This is as described above.

Next, if the position on the screen to which the remote control apparatus 110 directs mismatches the designated position, the image display apparatus 100 corrects the mismatch depending on the preset conditions (S1510).

For example, to determine whether the two positions mismatch each other, the image display apparatus 100 may first determine whether the remote control apparatus 110 directs to the screen and if it is determined that the remote control apparatus 110 directs to the screen, may compare the coordinates of the directed position with the coordinate values of the designated position to determine whether the two positions match each other or are within the error range. By the process, the image display apparatus 100 may finally determine whether to perform the correction.

Further, prior to the above process, the image display apparatus 100 may further determine whether the motion variation of the remote control apparatus 110 is larger or smaller than the threshold value after the position to which the remote control apparatus 110 directs enters the screen.

If the motion variation is larger than the threshold value, the image display apparatus 100 performs the correction such as differently allocating the weight depending on the direction (ex. whether the remote control apparatus 110 moves in the direction in which the pointer is present or moves in the opposite direction thereto) in which the remote control apparatus 110 moves. In this process, if the variation is large, the image display apparatus 100 may allocate the high weight. The detailed content thereof will be described below in more detail.

Further, the image display apparatus 100 may output the pointer to the position on the screen to which the remote control apparatus 110 directs by the correction of the mismatch (S1520).

Figure 16:
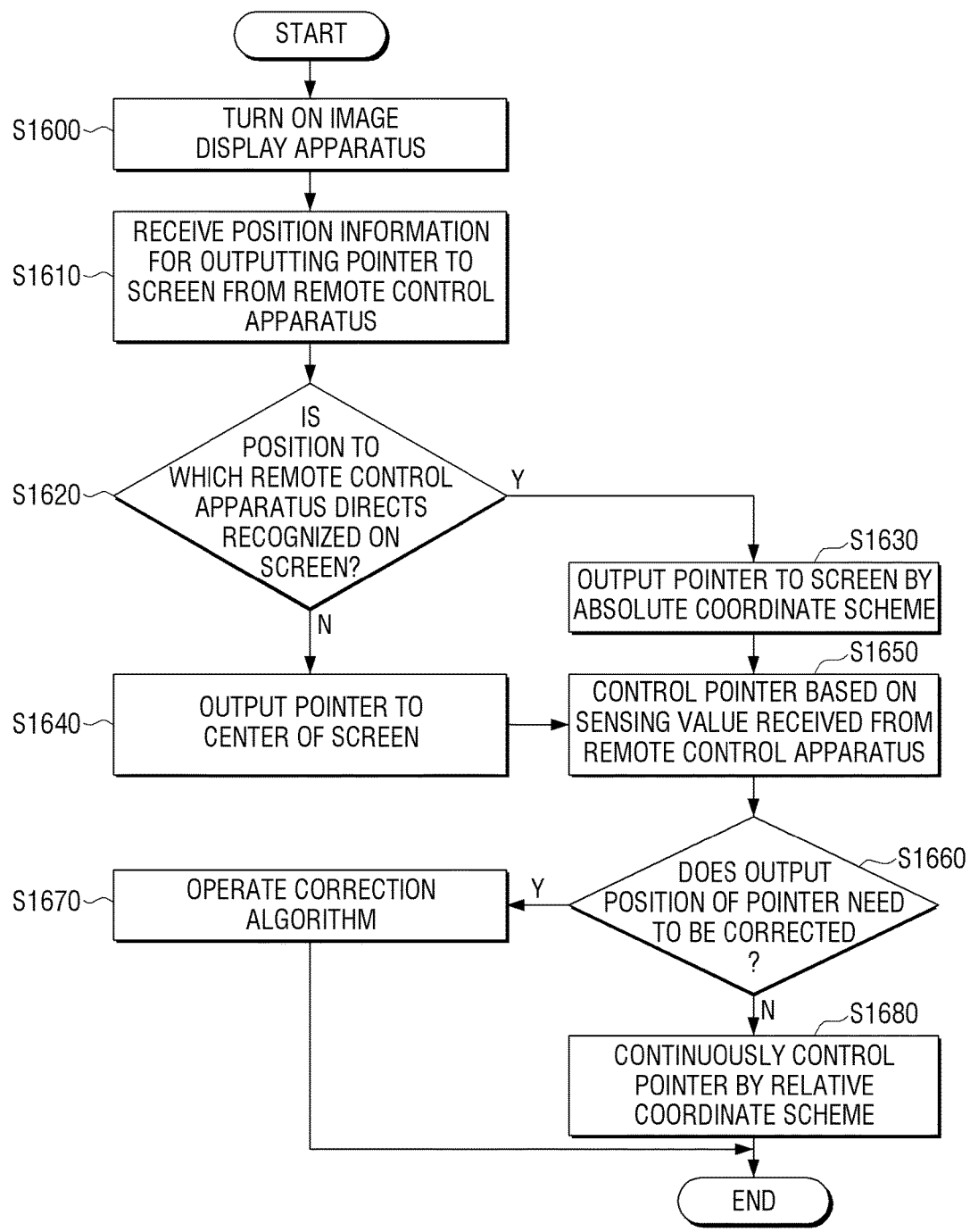
FIG. 16 is a flowchart illustrating an example driving process of an image display apparatus according to still another example embodiment of the present disclosure.

FIG. 16 is a flowchart illustrating an example driving process of an image display apparatus according to still another example embodiment of the present disclosure.

For convenience of explanation, referring to FIGS. 16 and 1, the image display apparatus 100 according to the example embodiment of the present disclosure may be turned on by the user command (S1600).

Next, the image display apparatus 100 may receive the position information for outputting the pointer to the screen from the remote control apparatus 110 (S1610). Here, the "position information" includes the absolute coordinate values and the relative coordinate values. The absolute coordinate values may be the information for determining whether the user directs the remote control apparatus 110 to the screen after the image display apparatus 100 is turned on. The reason is that if the image display apparatus 100 does not sense the sensing signal (ex. infrared signal) in the photographed image, the absolute coordinate values may not be generated.

The image display apparatus 100 may recognize whether the remote control apparatus 110 initially directs to the screen of the image display apparatus 100 from the received position information (S1620). For this purpose, the image display apparatus 100 determines whether the absolute coordinate values are present in the received position information.

Next, if the absolute coordinate values are detected, the image display apparatus 100 may output the pointer to the screen by the absolute coordinate scheme based on the detected absolute coordinate values (S1630) and if the absolute coordinate values are not detected, may output the pointer to the center of the screen (S1640).

Next, the image display apparatus 100 controls the pointer output on the screen by the relative coordinate scheme based on the sensing values received from the remote control apparatus 110 (S1650).

In the process of controlling the pointer output on the screen, the image display apparatus 100 may determine whether to correct the position of the pointer output on the screen (S1660). As one example, the image display apparatus 100 may determine whether the remote control apparatus 110 does not direct to the screen, whether the remote control apparatus 110 directs to the screen and then is out of the screen and then enters the screen again, or the like to determine whether the correction is made. Here, in connection with whether the remote control apparatus 110 is out of the screen, it may be determined that the remote control apparatus 110 enters the screen when the sensing signal is detected by simply analyzing the photographed image.

If the correction is necessary, the image display apparatus 100 may execute the correction algorithm therein (S1670), and if the correction is not necessary, the image display apparatus 100 may continuously control the pointer by the relative coordinate scheme based on the sensing values continuously provided from the remote control apparatus 110 (S1680). Here, the detailed content of the correction operation will be continuously described with reference to FIGS. 17 and 18.

Figure 17:
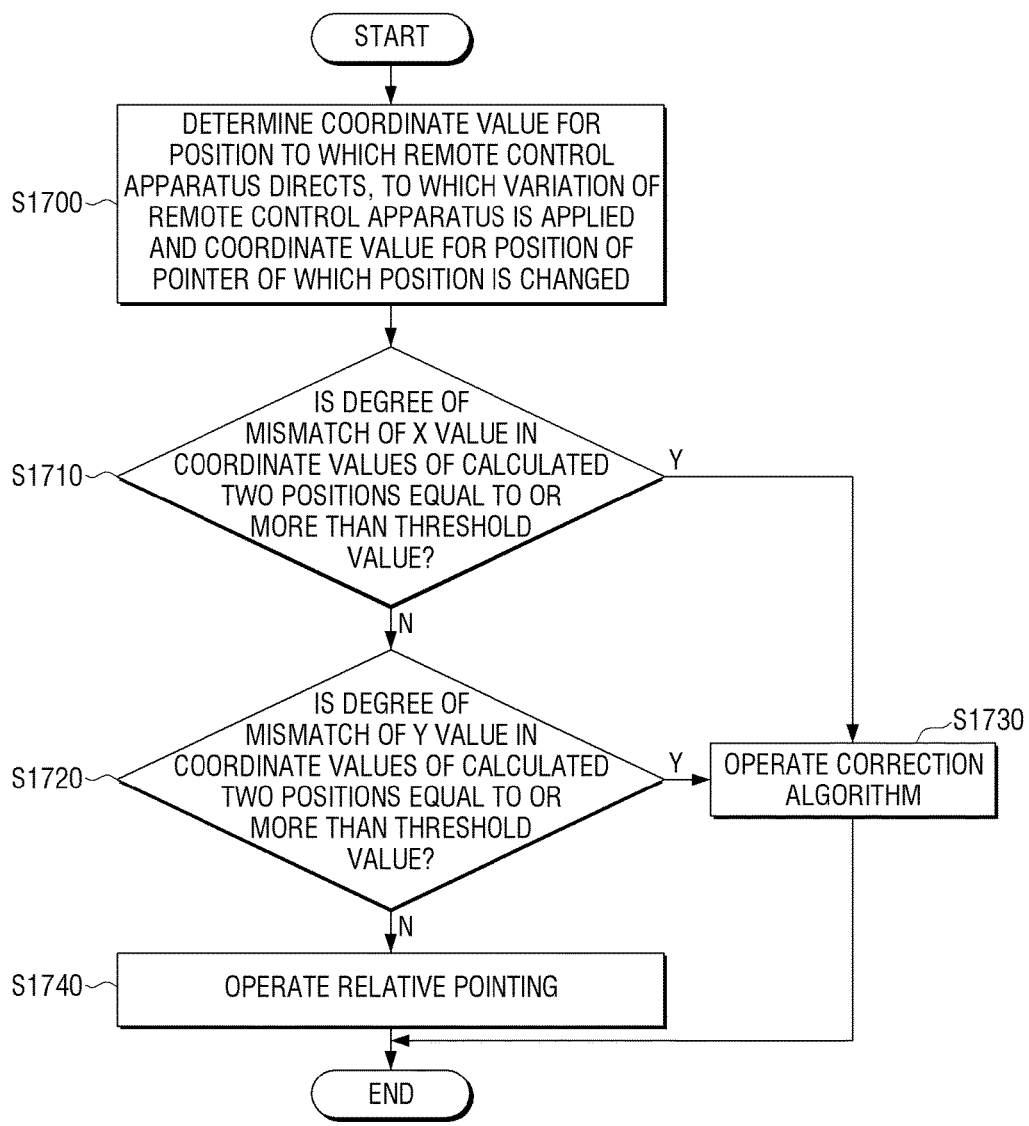
FIG. 17 is a flowchart illustrating an example process of a correction operation illustrated in FIG. 16.

FIG. 17 is a flowchart illustrating an example process of the correction operation illustrated in FIG. 16.

For convenience of explanation, referring to FIGS. 17 and 1, the image display apparatus 100 according to the example embodiment of the present disclosure determines the coordinate values for the directed position of the remote control apparatus 110 to which the variation for the motion of the remote control apparatus 110 is applied and the coordinate values for the position of the pointer of which the position is changed if it is determined that the correction needs to be made (S1700). Here, the calculated coordinate values are the absolute coordinate values.

Next, like step S1710 or S1720, the image display apparatus 100 may determine the variation of the X coordinate values and the variation of the Y coordinate values, respectively, to determine whether the variation is equal to or more than the threshold value.

In the step S1710, if the variation is equal to more than the threshold value, the image display apparatus 100 performs the correction process (S1730) and if the variation is smaller than the threshold value, may determine whether the variation of the Y coordinate values is equal to or more than the threshold value like step S1720.

As the determination result, if the variation is equal to or more than the threshold value, the image display apparatus 100 performs the correction operation and if the variation is smaller than the threshold value, controls the pointer by the relative coordinate scheme (S1740).

If the distance is smaller than the threshold value in step S1740, the image display apparatus 100 continuously controls the pointer by the relative coordinate scheme and if the distance is larger than the threshold value, may operate the correction algorithm.

Meanwhile, the image display apparatus 100 compares the variations for the X coordinate and the Y coordinate, respectively, with the threshold value in the steps S1710 and S1720, but may calculate the distance d between the two positions based on the coordinate values calculated in the step S1700 and determine whether the mismatch degree is equal to or more than the threshold value based on the calculated distance, and therefore the example embodiment of the present disclosure is not particularly limited to any one of the schemes.

Further, the above step S1710 or S1720 may be operated by changing an order and therefore the present disclosure is not particularly limited to the above order.

Figure 18:
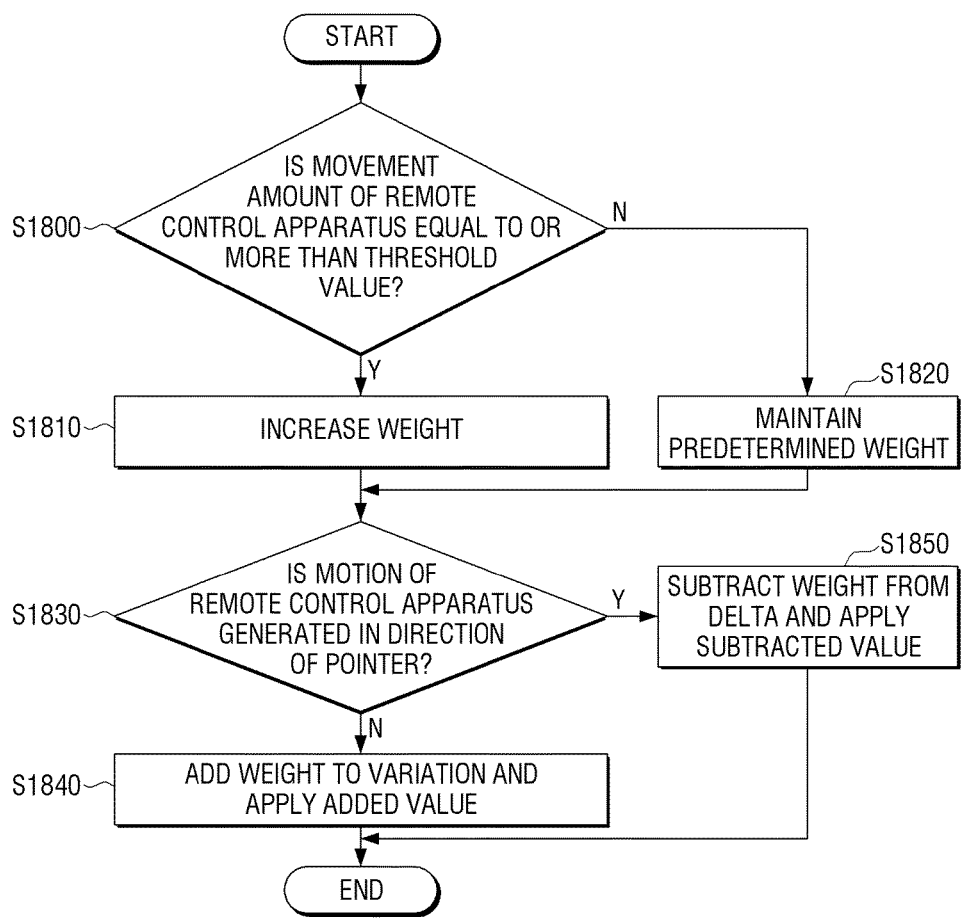
FIG. 18 is a flowchart illustrating an example process of the correction operation illustrated in FIG. 17.

FIG. 18 is a flowchart illustrating an example process of the correction operation illustrated in FIG. 17.

For convenience of explanation, referring to FIGS. 18 and 1, the image display apparatus 100 according to the example embodiment of the present disclosure may perform the following operation in the step S1730 of FIG. 17.

First, the image display apparatus 100 may determine whether the movement amount depending on the motion of the remote control apparatus 110 is equal to or more than the threshold value after the position to which the remote control apparatus 110 directs enters the screen (S1800). In other words, if the user directs the remote control apparatus 110 to the screen of the image display apparatus 100 again, it is determined how the remote control apparatus 110 moves.

As the determination result, if the motion of the remote control apparatus 110 is large, the weight is allocated to the variation and if the motion of the remote control apparatus 110 is not large, only the predetermined weight may be allocated to reduce the user confusion (S1810 and S1820). In step S1810, increasing the weight may refer, for example, to a situation in which different weights are allocated depending on the variation. That is, as the variation is getting larger, the high weight is allocated.

Next, the image display apparatus 100 determines whether the motion of the remote control apparatus 110 is generated in the pointer direction (S1830). The motion may be expected by the sensing values provided from the remote control apparatus 110, that is, the relative coordinate values.

If the remote control apparatus 110 moves in the opposite direction of the pointer, the image display apparatus 100 adds the weight to the variation to change the position of the pointer by the acquired coordinate values and output the pointer to the screen and if the remote control apparatus 110 moves in the direction of the pointer, the image display apparatus 110 subtracts the weight from the variation to change the position of the pointer by the acquired coordinate values and output the pointer to the screen (S1840 and S1850).

The correction of the mismatch is performed depending on the foregoing process, and thus the image display apparatus 100 performs the correction operation quickly once or several times to correct the mismatch.

Meanwhile, the determination on whether the mismatch occurs according to the example embodiment of the present disclosure may be made when the position to which the remote control apparatus 110 directs is tracked on the screen and then disappears and then appears again. The case in which the image display apparatus stores the absolute coordinate values for the directed position and then calculates the absolute coordinate values by reflecting the sensing values received from the remote control apparatus 110 to determine whether the remote control apparatus 110 is out of the screen is already described.

Describing in more detail, provided that the position to which the current remote control apparatus 110 directs is at position (2, 2) on the screen of the image display apparatus 100. Further, if the user allocates the variation by 3 to the left and thus the remote control apparatus 110 moves, it is determined that the position to which the remote control apparatus 110 currently directs is (−1, 2), and therefore is out of the screen. In other words, since the absolute coordinate values actually do not have "-", the above determination may be made. Next, if the user allocates the variation by 3 to the right and thus the remote control apparatus 110 moves, the currently directed position is (2, 2), and therefore it may be determined that the remote control apparatus 110 enters the screen again. Here, (2, 2) is a result obtained by reflecting variation 3 only to the X coordinate with respect to the pre-stored absolute coordinate value (−1, 2).

As such, the image display apparatus 100 stores the determined absolute coordinate values and then refers to the stored absolute coordinate values to determine whether the position to which the remote control apparatus 110 directs is out of the screen and may use the stored value to determine whether the remote control apparatus 110 enters the screen again.

The remote control apparatus 110 photographs the screen of the image display apparatus 100 and it may be determined that when the sensing signal output from the image display apparatus 100 is not detected in the photographed image, the remote control apparatus 110 is out of the screen and when the sensing signal is detected in the photographed image, the remote control apparatus 110 directs to the screen. Determining whether the mismatch occurs is various, and therefore the present disclosure is not particularly limited to the foregoing content.

Therefore, the operation of determining whether the distance between the two positions mentioned in the present disclosure is equal to or more than the threshold value, the operation of determining whether the motion variation of the remote control apparatus 110 is equal to or more than the threshold value if the distance is equal to or more than the threshold value, or the like may be considered to be the 'preset condition' associated with how to perform the correction.

However, the operation of determining whether the distance between the two positions is equal to or more than the threshold value and the operation of determining whether the motion variation of the remote control apparatus 110 is equal to or more than the threshold value if the distance is equal to or more than the threshold value may also be included in the process of determining whether the mismatch occurs, and therefore the present disclosure is not particularly limited to the foregoing content.

Further, the case in which the correction algorithm is performed by the image display apparatuses 100' and 100" is described above, but the correction algorithm may be performed in peripheral devices of the image display apparatuses 100' and 100", for example, a set top box, the remote control apparatus, an access point, or the service providing apparatus 130 of FIG. 1 or may be performed by the mutual cooperation of the plurality of apparatuses, and therefore in the present disclosure, the correction operation is not particularly limited to the image display apparatuses 100' and 100".

Further, the present disclosure describes in detail that when the position to which the remote control apparatus 110 directs is changed from the state in which the remote control apparatus 110 is out of the screen into the screen to visually display the natural motion of the pointer to the user, the pointer displayed on the screen moves by the variation and then the correction is made, but in the present disclosure, since the coordinate values at the position where the pointer is out of the screen are stored in the memory and thus are already known, the pointer may be displayed on the screen by immediately reflecting the variation to the stored coordinate values and therefore in the present disclosure, the correction scheme of the pointer is not particularly limited.

For example, the image display apparatus 100 knows the coordinate value (−1, 2) in the state in which the remote control apparatus 110 is out of the screen and if the user allocates the variation by 3 to the right and thus the remote control apparatus 110 moves, displays the pointer at the coordinate value (2, 2) acquired by directly reflecting the variation to (−1, 2). In connection with this, those skilled in the art may practice by easily deriving the above changed method to output the pointer to the position on the screen to which the remote control apparatus 110 directs based on the description of the present disclosure.

Meanwhile, although the case in which all the components configuring an example embodiment of the present disclosure are combined with each other as one component or are combined and operated with each other has been described, the present disclosure is not necessarily limited thereto. That is, all the components may be operated, being optionally coupled with one or more within the scope of the present disclosure. In addition, although each of all the components may be implemented by one independent hardware, some or all of the respective components which are selectively combined with each other may be implemented by a computer program having a program module performing some or all of functions combined with each other in one or plural hardware. Codes and code segments configuring the computer program may be easily inferred by those skilled in the art to which the present disclosure pertains. The computer program is stored in non-transitory computer readable media and is read and executed by a computer, thereby making it possible to implement an example embodiment of the present disclosure.

Here, the non-transitory computer readable medium may refer, for example, to a medium that semi-permanently stores data therein and is readable by a device. In detail, the programs described above may be stored and provided in the non-transitory computer readable medium such as a CD, a digital versatile disk (DVD), a hard disk, a Blu-ray disk, a USB, a memory card, a ROM, or the like.

Although example embodiments of the present disclosure have been illustrated and described, the present disclosure is not limited to the above-mentioned specific example embodiment, but may be variously modified by those skilled in the art to which the present disclosure pertains without departing from the spirit and scope of the present disclosure as claimed in the claims. In addition, such modifications should also be understood to fall within the scope of the present disclosure.

What is claimed is:

1. An image display apparatus, comprising:
a display; and
a processor comprising processing circuitry configured to control the display to display a pointer at a preset area of a screen when a position to which a remote control apparatus directs is outside of the screen of the display, to move the pointer into the screen to correspond to a movement amount of the position and display the pointer, and to display the pointer at the position to which the remote control apparatus directs,
wherein the processor is further configured to perform a correction for a difference between the position to which the remote control apparatus directs and the position of the pointer moved and displayed, and perform the correction at least by determining a degree of correction differently according to whether a direction of a motion of the remote control apparatus is identical or opposite to the direction of the pointer moved and displayed.

2. The image display apparatus as claimed in claim 1, wherein the display is configured to display the pointer at an edge of the screen in a direction in which the position is outside of the screen or at a center of the screen.

3. The image display apparatus as claimed in claim 1, further comprising:
a communication interface comprising communication circuitry configured to receive position information associated with the movement amount from the remote control apparatus,
wherein the processor is configured to control the display to move the pointer based on the received position information and to display the pointer on the screen.

4. The image display apparatus as claimed in claim 1, wherein the processor is configured to control the display to determine a difference between the position to which the remote control apparatus directs and the position of the pointer moved and displayed and to display the pointer at the position to which the remote control apparatus directs when the determined difference is equal to or more than a first threshold value.

5. The image display apparatus as claimed in claim 4, wherein the processor is configured to control the display to determine whether a motion variation of the remote control apparatus is equal to or more than a second threshold value when the determined difference is equal to or more than the first threshold value and to display the pointer at the position to which the remote control apparatus directs when the motion variation is equal to or more than the second threshold value.

6. The image display apparatus as claimed in claim 1, wherein the processor is configured to add a weight to a motion variation of the pointer to perform the correction when the remote control apparatus moves in an opposite direction of the pointer.

7. The image display apparatus as claimed in claim 6, wherein the processor is configured to add different sizes of weights depending on the size of the variation to perform the correction.

8. The image display apparatus as claimed in claim 1, wherein the processor is configured to subtract a weight from a motion variation of the pointer to perform the correction when the remote control apparatus moves in the direction of the pointer.

9. A method of driving an image display apparatus, comprising:
   displaying a pointer at a preset area of a screen when a position to which a remote control apparatus directs is outside of the screen of the image display apparatus;
   moving the pointer into the screen to correspond to a movement amount of the position and displaying the pointer; and
   displaying the pointer at the position to which the remote control apparatus directs,
   wherein the displaying of the pointer at the position to which the remote control apparatus directs includes performing a correction for a difference between the position to which the remote control apparatus directs and the position of the pointer moved and displayed, and
   wherein the performing a correction for a difference includes performing the correction by determining a degree of correction differently according to whether a direction of a motion of the remote control apparatus is identical or opposite to the direction of the pointer moved and displayed.

10. The driving method as claimed in claim 9, wherein in the displaying of the pointer at the preset area, the pointer is displayed at an edge of the screen in a direction in which the position is outside of the screen or at a center of the screen.

11. The driving method as claimed in claim 9, further comprising:
    receiving position information associated with the movement amount from the remote control apparatus,
    wherein in the moving and displaying of the displayed pointer, the pointer moves based on the received position information.

12. The driving method as claimed in claim 9, wherein the displaying of the pointer at the position to which the remote control apparatus directs includes:
    determining a difference between the position to which the remote control apparatus directs and the position of the pointer moved and displayed; and,
    displaying the pointer at the position to which the remote control apparatus directs when the determined difference is equal to or more than a first threshold value.

13. The driving method as claimed in claim 12, wherein the displaying of the pointer at the position to which the remote control apparatus directs further includes:
    determining whether a motion variation of the remote control apparatus is equal to or more than a second threshold value when the determined difference is equal to or more than the first threshold value, and
    the pointer is displayed at the position to which the remote control apparatus directs when the motion variation is equal to or more than the second threshold value.

14. The driving method as claimed in claim 9, wherein performing the correction by determining a degree of correction differently includes a weight is added to a motion variation of the pointer to perform the correction when the remote control apparatus moves in an opposite direction of the pointer.

15. The driving method as claimed in claim 14, wherein in the differently performing the correction by making a degree of correction different, different sizes of weights are added depending on the size of the variation to perform the correction.

16. The driving method as claimed in claim 9, wherein the performing the correction by determining a degree of correction differently includes a weight is subtracted from a motion variation of the pointer to perform the correction when the remote control apparatus moves in a direction of the pointer.

17. A non-transitory computer readable recording medium including a program which, when executed by a processor, causes the processor to perform operations of a driving method of an image display apparatus, wherein the driving method of the image display apparatus includes:
    performing a control to display a pointer at a preset area of a screen when a position to which a remote control apparatus directs is outside of the screen of the image display apparatus;
    performing a control to move the pointer into the screen to correspond to a movement amount of the position and display the pointer; and
    performing a control to display the pointer at the position to which the remote control apparatus directs,
    wherein the performing a control to display the pointer at the position to which the remote control apparatus directs includes performing a control to perform a correction for a difference between the position to which the remote control apparatus directs and the position of the pointer moved and displayed, and
    wherein the performing a control to perform a correction for a difference includes, performing a control to perform the correction by determining a degree of correction differently according to whether a direction of a motion of the remote control apparatus is identical or opposite to the direction of the pointer moved and displayed.

* * * * *